(12) United States Patent
Yahara et al.

(10) Patent No.: US 6,633,893 B2
(45) Date of Patent: *Oct. 14, 2003

(54) FILE MANAGEMENT SYSTEM AND METHOD, AND STORAGE MEDIUM

(75) Inventors: Masashi Yahara, Yokohama (JP); Tsutomu Murayama, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/390,282

(22) Filed: Sep. 3, 1999

(65) Prior Publication Data
US 2003/0097377 A1 May 22, 2003

(30) Foreign Application Priority Data

Sep. 4, 1998 (JP) .................... 10-267346
Sep. 4, 1998 (JP) .................... 10-267347

(51) Int. Cl.$^7$ .................... G06F 12/00
(52) U.S. Cl. .................... 707/205; 707/200; 358/403; 715/514
(58) Field of Search .................... 707/205, 514, 707/200; 358/403; 715/514

(56) References Cited

U.S. PATENT DOCUMENTS 5,363,504 A   11/1994  Hasuo .................... 395/600
5,742,808 A   4/1998   Hasuo .................... 395/601

OTHER PUBLICATIONS

Alan Simpson, Mastering WordPerfect 5.1 & 5.2 For Windows, Copyright 1993 SYBEX Inc.*

* cited by examiner

Primary Examiner—Kim Vu
Assistant Examiner—Hung Pham
(74) Attorney, Agent, or Firm—Fitzpatrick, Cella, Harper & Scinto

(57) ABSTRACT

A file management system provided with an improved operability by arranging attribute information of recorded files, file search result information, and index information of files and listing the information per a file together in a single file list, by adding an identical indicator mark to a plurality of files for which identical processing is requested to be performed in the file list, and by searching for the files having the indicator mark in the file list to perform predetermined processing for the found files. The predetermined processing includes an index input, printing files, and storing files which have been scanned.

33 Claims, 34 Drawing Sheets

| Properties | No. | Title | Chapter | Pages | Rank | Entry Date |
|---|---|---|---|---|---|---|
| ○ · · · · | 1 | menu spec | 1-1 | 23 | A | 98/06/26 |
| ○ · · · · | 2 | menu spec | 1-2 | 35 | B | 98/06/26 |
| ○ · · · · | 3 | menu spec | 1-3 | 12 | D | 98/06/26 |
| ○ · · · · | 4 | X-2 report |  | 50 | A | 98/06/26 |
| ○ · · · · | 5 | X-2 report |  | 45 |  | 98/06/26 |
| ○ · · · · | 6 |  |  | 44 |  | 98/06/29 |
| ○ · · · · | 7 |  |  | 16 |  | 98/06/29 |
| ○ · · · · | 8 |  |  | 8 |  | 98/07/21 |
| ○ · · · · | 9 |  |  | 9 |  | 98/07/21 |
| ○ · · · · | 10 |  |  | 12 |  | 98/07/21 |
| △ · · · · | 11 | menu spec | 2-1 | 0 |  |  |
| △ · · · · | 12 | menu spec | 2-2 | 0 |  |  |
| △ · · · · | 13 | menu spec | 3-1 | 0 |  |  |
| △ · · · · | 14 | installer spec |  | 0 |  |  |
| △ · · · · | 15 | installer spec |  | 0 |  |  |
| □ · · · · | * |  |  |  |  |  |

FIG. 4

| Properties | No. | Title | Chapter | | Pages | Rank | Entry Date |
|---|---|---|---|---|---|---|---|
| ○ ・・・ | 1 | menu spec | 1-1 | | 23 | A | 98/06/26 |
| ○ ・・・ | 2 | menu spec | 1-2 | | 35 | B | 98/06/26 |
| ○ ・・・ | 3 | menu spec | 1-3 | | 12 | D | 98/06/26 |
| ○ ・・・ | 4 | X-2 report | | | 50 | A | 98/06/26 |
| ○ ・・・ | 5 | X-2 report | | | 45 | | 98/06/26 |
| ○ ・・・ | 6 | | | | 44 | | 98/06/29 |
| ○ ・・・ | 7 | | | | 16 | | 98/06/29 |
| ○ ・・・ | 8 | | | | 8 | | 98/07/21 |
| ○ ・・・ | 9 | | | | 9 | | 98/07/21 |
| ○ ・・・ | 10 | | | | 12 | | 98/07/21 |
| △ ・・・ | 11 | menu spec | 2-1 | | 0 | | |
| △ ・・・ | 12 | menu spec | 2-2 | | 0 | | |
| △ ・・・ | 13 | menu spec | 3-1 | | 0 | | |
| △ ・・・ | 14 | installer spec | | | 0 | | |
| △ ・・・ | 15 | installer spec | | | 0 | | |
| □ ・・・ | * | | | | | | |

FIG. 5A

| Properties | No. | Title | Chapter | Pages | Rank | Entry Date |
|---|---|---|---|---|---|---|
| ○ · · · · | 1 | menu spec | 1-1 | 23 | A | 98/06/26 |
| ○ · · · · | 2 | menu spec | 1-2 | 35 | B | 98/06/26 |
| ○ · · · · | 3 | menu spec | 1-3 | 12 | D | 98/06/26 |
| ○ · · · · | 4 | function spec | 10 | 3 | C | 98/07/21 |
| ○ · · · · | 5 | function spec | 12 | 5 | | 98/07/21 |
| ○ · · · · | 6 | X-2 report | | 50 | | 98/07/21 |
| ○ · · · · | 7 | X-2 report | | 45 | | 98/07/21 |
| ○ · · · · | 8 | function spec | 1 (all) | 32 | A | 98/07/21 |
| ○ · · · · | 9 | menu spec | 2-1 | 12 | B | 98/07/21 |
| ○ · · · · | 10 | menu spec | 2-2 | 14 | B | 98/07/21 |
| ○ · · · · | 11 | menu spec | 3-1 | 36 | A | 98/07/21 |
| ○ · · · · | 12 | X-1 report | | 50 | | 98/07/21 |
| ○ · · · · | 13 | X-1 report | | 50 | | 98/07/21 |
| ○ · · · · | 14 | function spec | 11 | 11 | C | 98/07/21 |
| △ · · · · | * | | | | | |

FIG. 5B

| Properties | No. | Title | Chapter | Pages | Rank | Entry Date |
|---|---|---|---|---|---|---|
| ○ · · · · | 1 | menu spec | 1-1 | 23 | A | 98/06/26 |
| ○ · · · · | 2 | function spec | 1 (all) | 32 | A | 98/07/21 |
| ○ · · · · | 3 | menu spec | 3-1 | 36 | A | 98/07/21 |
| □ · · · · | * | | | | | |

FIG. 6A

| Properties | No. | Title | Chapter | Pages | Rank | Entry Date |
|---|---|---|---|---|---|---|
| ○ · · · · | 1 | menu spec | 1-1 | 23 | A | 98/06/26 |
| ○ · · · · | 2 | function spec | 1 (all) | 32 | A | 98/07/21 |
| ○ · · · · | 3 | menu spec | 3-1 | 36 | A | 98/07/21 |
| □ · · · · | * | | | | | |

FIG. 6B

| Properties | No. | Title | Chapter | Pages | Rank | Entry Date |
|---|---|---|---|---|---|---|
| ○ · · · · | 1 | menu spec | 1-1 | 23 | A | 98/06/26 |
| ○ · · · · | 2 | function spec | 1 (all) | 32 | A | 98/07/21 |
| ○ · · · · | 3 | menu spec | 3-1 | 36 | A | 98/07/21 |
| ○ · · · · | 4 | | | 10 | | 98/07/21 |
| ○ · · · · | 5 | | | 10 | | 98/07/21 |
| ○ · · · · | 6 | | | 5 | | 98/07/21 |
| △ · · · · | * | | | | | |

FIG. 7A

| Properties | No. | Title | Chapter | Pages | Rank | Entry Date |
|---|---|---|---|---|---|---|
| ○ · · · · | 1 | menu spec | 1-1 | 23 | A | 98/06/26 |
| ○ · · · · | 2 | function spec | 1 (all) | 32 | A | 98/07/21 |
| ○ · · · · | 3 | menu spec | 3-1 | 36 | A | 98/07/21 |
| ○ · · · · | 4 | ▼ | | 10 | | 98/07/21 |
| ○ · · · · | 5 | | | 10 | | 98/07/21 |
| ○ · · · · | 6 | | | 5 | | 98/07/21 |
| □ · · · · | * | | | | | |

FIG. 7B

| Properties | No. | Title | Chapter | Pages | Rank | Entry Date |
|---|---|---|---|---|---|---|
| ○ · · · · | 1 | menu spec | 1-1 | 23 | A | 98/06/26 |
| ○ · · · · | 2 | function spec | 1 (all) | 32 | A | 98/07/21 |
| ○ · · · · | 3 | menu spec | 3-1 | 36 | A | 98/07/21 |
| ○ · · · · | 4 | X-3 report | 1 | 10 | C | 98/07/21 |
| ○ · · · · | 5 | X-3 report | 2 | 10 | C | 98/07/21 |
| ○ · · · · | 6 | menu spec | 3-2 | 5 | B ▼ | 98/07/21 |
| □ · · · · | * | | | | | |

FIG. 8A

| Properties | No. | Title | Chapter | Pages | Rank | Entry Date |
|---|---|---|---|---|---|---|
| ○ · · · · | 1 | menu spec | 1-1 | 23 | A | 98/06/26 |
| ○ · · · · | 2 | function spec | 1 (all) | 32 | A | 98/07/21 |
| ○ · · · · | 3 | menu spec | 3-1 | 36 | A | 98/07/21 |
| ○ · · · · | 4 | X-3 report | 1 | 10 | C | 98/07/21 |
| ○ · · · · | 5 | X-3 report | 2 | 10 | C | 98/07/21 |
| ○ · · · · | 6 | menu spec | 3-2 | 5 | B | 98/07/21 |
| □ · · · · | * | ▼ | | | | |

FIG. 8B

| Properties | No. | Title | Chapter | Pages | Rank | Entry Date |
|---|---|---|---|---|---|---|
| ○ · · · · | 1 | menu spec | 1-1 | 23 | A | 98/06/26 |
| ○ · · · · | 2 | function spec | 1 (all) | 32 | A | 98/07/21 |
| ○ · · · · | 3 | menu spec | 3-1 | 36 | A | 98/07/21 |
| ○ · · · · | 4 | X-3 report | 1 | 10 | C | 98/07/21 |
| ○ · · · · | 5 | X-3 report | 2 | 10 | C | 98/07/21 |
| ○ · · · · | 6 | menu spec | 3-2 | 5 | B | 98/07/21 |
| ○ · · · · | 7 | X-11 report | 1 | 0 | | |
| ○ · · · · | 8 | X-11 report | 2 | 0 | | |
| ○ · · · · | 9 | X-12 report | 1 ▼ | 0 | | |
| □ · · · · | * | | | | | |

FIG. 9A

| Properties | No. | Title | Chapter | Pages | Rank | Entry Date |
|---|---|---|---|---|---|---|
| ○···· | 1 | menu spec | 1-1 | 23 | A | 98/06/26 |
| ○···· | 2 | function spec | 1 (all) | 32 | A | 98/07/21 |
| ○···· | 3 | menu spec | 3-1 | 36 | A | 98/07/21 |
| ○···· | 4 | X-3 report | 1 | 10 | C | 98/07/21 |
| ○···· | 5 | X-3 report | 2 | 10 | C | 98/07/21 |
| ○···· | 6 | menu spec | 3-2 | 5 | B | 98/07/21 |
| △···· | 7 | X-11 report | 1 | 0 | | 98/07/21 |
| △···· | 8 | X-11 report | 2 | 0 | | |
| △···· | 9 | X-12 report | 2 | 0 | | |
| □···· | * | | | | | |

FIG. 9B

| Properties | No. | Title | Chapter | Pages | Rank | Entry Date |
|---|---|---|---|---|---|---|
| ○···· | 1 | menu spec | 1-1 | 23 | A | 98/06/26 |
| ○···· | 2 | function spec | 1 (all) | 32 | A | 98/07/21 |
| ○···· | 3 | menu spec | 3-1 | 36 | A | 98/07/21 |
| ○···· | 4 | X-3 report | 1 | 10 | C | 98/07/21 |
| ○···· | 5 | X-3 report | 2 | 10 | C | 98/07/21 |
| ○···· | 6 | menu spec | 3-2 | 5 | B | 98/07/21 |
| ○···· | 7 | X-11 report | 1 | 12 | | 98/07/21 |
| ○···· | 8 | X-11 report | 2 | 8 | | 98/07/21 |
| ○···· | 9 | X-12 report | 1 | 22 | | 98/07/21 |
| ○···· | * | | | | | |

FIG. 10

| Properties | No. | Title | Chapter | Pages | Rank | Entry Date |
|---|---|---|---|---|---|---|
| ○◎ · · · | 1 | | | 23 | A | 98/06/26 |
| ○◎ · · · | 2 | | | 35 | B | 98/06/26 |
| ○◎ · · · | 3 | | | 12 | D | 98/06/26 |
| ○ · · · · | 4 | function spec | 10 | 3 | A | 98/07/21 |
| ○◎ · · · | 5 | | | 5 | | 98/07/21 |
| ○ · · · · | 6 | X-2 report | | 50 | | 98/07/21 |
| ○ · · · · | 7 | X-2 report | | 45 | | 98/07/21 |
| ○ · · · · | 8 | function spec | 1 (all) | 32 | A | 98/07/21 |
| ○ · · · · | 9 | menu spec | 2-1 | 12 | B | 98/07/21 |
| ○ · · · · | 10 | menu spec | 2-2 | 14 | B | 98/07/21 |
| ○ · · · · | 11 | menu spec | 3-1 | 36 | A | 98/07/21 |
| ○◎ · · · | 12 | | | 50 | | 98/07/21 |
| ○ · · · · | 13 | X-1 report | | 50 | | 98/07/21 |
| ○◎ · · · | 14 | | | 11 | C | 98/07/21 |
| ○ · · · · | 15 | X-3 report | 1 | 10 | C | 98/07/21 |
| ○ · · · · | 16 | X-3 report | 2 | 10 | A | 98/07/21 |

FIG. 11

| Properties | No. | Title | Chapter | Pages | Rank | Entry Date |
|---|---|---|---|---|---|---|
| ○◎ · · · | 1 | menu spec | 1-1 | 23 | A | 98/06/26 |
| ○◎ · · · | 2 | menu spec | 1-2 | 35 | B | 98/06/26 |
| ○◎ · · · | 3 | menu spec | 1-3 | 12 | D | 98/06/26 |
| ○ · · · · | 4 | function spec | 10 | 3 | C | 98/07/21 |
| ○◎ · · · | 5 | function spec | 12 | 5 |  | 98/07/21 |
| ○ · · · · | 6 | X-2 report |  | 50 |  | 98/07/21 |
| ○ · · · · | 7 | X-2 report |  | 45 |  | 98/07/21 |
| ○ · · · · | 8 | function spec | 1 (all) | 32 | A | 98/07/21 |
| ○ · · · · | 9 | menu spec | 2-1 | 12 | B | 98/07/21 |
| ○ · · · · | 10 | menu spec | 2-2 | 14 | B | 98/07/21 |
| ○ · · · · | 11 | menu spec | 3-1 | 36 | A | 98/07/21 |
| ○◎ · · · | 12 | X-1 report |  | 50 |  | 98/07/21 |
| ○ · · · · | 13 | X-1 report |  | 50 |  | 98/07/21 |
| ○◎ · · · | 14 | function spec | 11 | 11 | C | 98/07/21 |
| ○ · · · · | 15 | X-3 report | 1 | 10 | C | 98/07/21 |
| ○ · · · · | 16 | X-3 report | 2 | 10 | C | 98/07/21 |

FIG. 15

| Properties | No. | Title | Chapter | Pages | Rank | Entry Date |
|---|---|---|---|---|---|---|
| ○·▽·· | 1 | menu spec | 1-1 | 23 | A | 98/06/26 |
| ○◎··· | 2 | menu spec | 1-2 | 35 | B | 98/06/26 |
| ○·▽·· | 3 | menu spec | 1-3 | 12 | D | 98/06/26 |
| ○···· | 4 | function spec | 10 | 3 | C | 98/07/21 |
| ○◎··· | 5 | function spec | 12 | 5 |  | 98/07/21 |
| ○···· | 6 | X-2 report |  | 50 |  | 98/07/21 |
| ○···· | 7 | X-2 report |  | 45 |  | 98/07/21 |
| ○···· | 8 | function spec | 1 (all) | 32 | A | 98/07/21 |
| ○···· | 9 | menu spec | 2-1 | 12 | B | 98/07/21 |
| ○···· | 10 | menu spec | 2-2 | 14 | B | 98/07/21 |
| ○···· | 11 | menu spec | 3-1 | 36 | A | 98/07/21 |
| ○◎··· | 12 | X-1 report |  | 50 |  | 98/07/21 |
| ○···· | 13 | X-1 report |  | 50 |  | 98/07/21 |
| ○◎··· | 14 | function spec | 11 | 11 | C | 98/07/21 |
| ○···· | 15 | X-3 report | 1 | 10 | C | 98/07/21 |
| ○···· | 16 | X-3 report | 2 | 10 | C | 98/07/21 |

FIG. 23

| Properties | No. | Title | Chapter | Pages | Rank | Entry Date |
|---|---|---|---|---|---|---|
| ○◎··· | 1 | menu spec | 1-1 | 23 | A | 98/07/22 |
| ○◎··· | 2 | menu spec | 1-2 | 35 | B | 98/07/22 |
| ○◎··· | 3 | menu spec | 1-3 | 12 | D | 98/07/22 |
| ○···· | 4 | X-2 report | | 50 | A | 98/07/22 |
| ○···· | 5 | X-2 report | | 45 | | 98/07/22 |
| ○···· | 6 | | | 44 | | 98/07/22 |
| ○···· | 7 | | | 16 | | 98/07/22 |
| ○◎··· | 8 | | | 8 | | 98/07/22 |
| ○···· | 9 | | | 9 | | 98/07/22 |
| ○···· | 10 | | | 12 | | 98/07/22 |
| ○···· | 11 | menu spec | 2-1 | 0 | | |
| △◎··· | 12 | menu spec | 2-2 | 0 | | |
| △◎··· | 13 | menu spec | 3-1 | 0 | | |
| △···· | 14 | installer spec | | 0 | | |
| ○···· | 15 | installer spec | | 0 | | |
| □···· | * | | | | | |

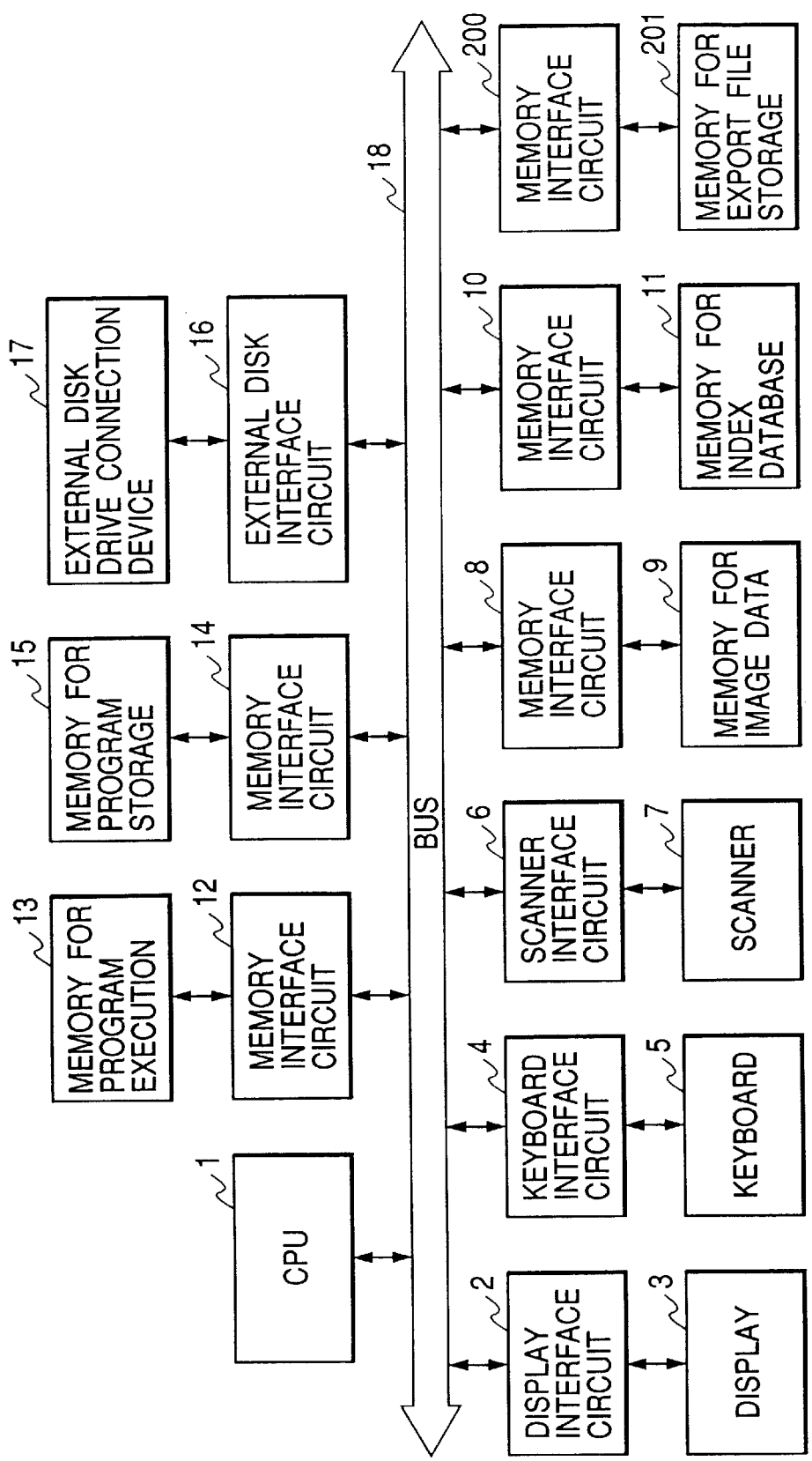

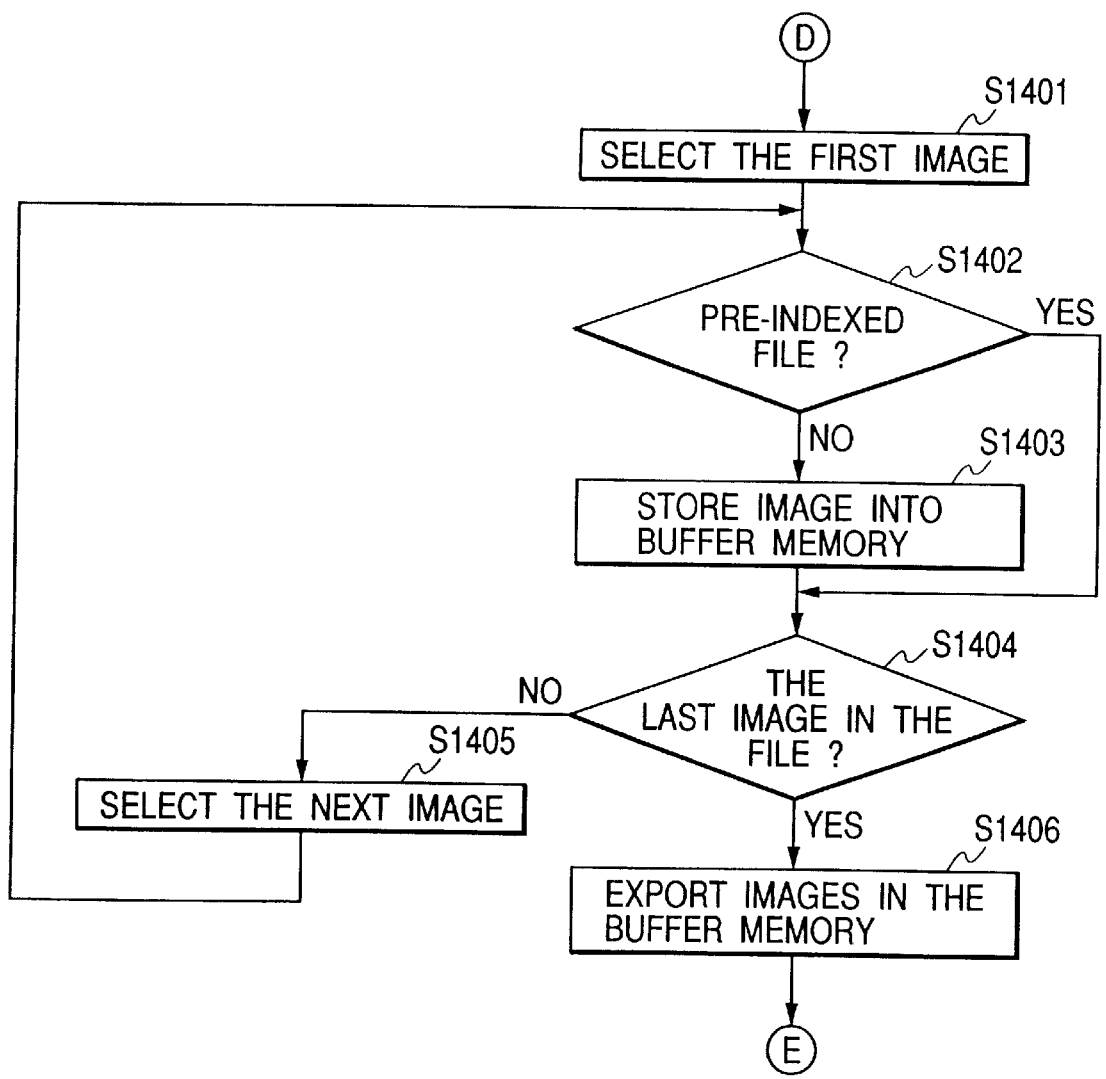

FILE MANAGEMENT SYSTEM AND METHOD, AND STORAGE MEDIUM

BACKGROUND OF THE INVENTION

1. Field of the Invention

The present invention relates to a file management system, a file management method, and a storage medium for storing a plural files therein, and further relates to a file management system which can search files, file management method which is applied to the file management system, and a storage medium for storing programs for executing the file management program.

2. Related Background Art

Conventionally, there is known an image management system in which a manuscript image such as a document or a drawing is read and appropriately edited and the image is recorded to a magnetic disk or an optical magnetic disk for a management.

In general, in this type of an image management system, image information obtained by reading a manuscript image is compressed before being recorded to a hard disk or an optical disk. In addition, index information for an image search is related with the image information for recording.

A required image is searched for on the basis of this index information and the image information is read out so as to be displayed on a display unit or the image is output to a record sheet by a printer. Furthermore, various types of image processing such as adding, editing, or processing an image is performed, if necessary.

Referring to FIGS. 27A and 27B, there is shown a block diagram of a constitution of a conventional and general document management system. FIG. 27A illustrates a block diagram of a constitution of an image filing system used for scanning a manuscript with a scanner and storing the image in a document database. A scanner 120 optically reads a manuscript and converts the read image to digital signals with a photoelectric conversion element or the like. A scanner control means 121 controls an operation of the scanner 120. An index input means 123 inputs an index for the read image. A database management part 122 manages the index and the image. A document database 124 is used for storing images or index information. In this diagram, arrows indicate information flows.

First, an image read from a manuscript with the scanner 120 is sent to the database management part 122 via the scanner control means 121. In addition, index information sent from index Input means 123 is sent to database management means 122. In the database management means 122, index information inputted from the index input means 123 is added to the image received from the scanner control means 121 and they are stored in the document database 124.

FIG. 27B illustrates a block diagram of a constitution used for searching for a desired image from the document database with a search part. A document database 130 is used for storing images and indices therefor. A database management means 131 manages the document database 130. A search means 132 searches for a desired image from the document database 130 and it searches for an image according to search conditions inputted from a search condition input part 133. A search result list management means 134 manages search results. A reference numeral 135 indicates a search result list. In this diagram, arrows indicate information flows.

First, conditions of an image required to be searched for are inputted from the search condition input part 133, an image which satisfies the conditions is searched from document database 130 through document database management means 131 by the search part 132, and said obtained search result is output to the search result list 135 via the search result list management means 134.

On the basis of the search result list 135, the search result list management means 134 can send image information of searched documents to image display part 141 through image display control means 140 and instruct Image display part 141 to display said image, or to Printer 143 through Printer control means 142 and instruct Printer 143 to print said image.

In addition, by substituting printer control means 142 for an image information change means and printer 143 for an export file storage part, the image information change means converts the information to a general type of an image file format and the export file storage part stores the file.

In the above conventional document management system, however, there are problems described below and their improvement has been desired. In other words, a document recording operation is separated from a search operation. Also in the recording operation, fixed procedures have been used for the image scanning and the index input operation. Furthermore, in the recording operation, the document recording operation and the index input operation have been performed for each document.

Therefore, in a recording operation for a plural documents, an operator must perform the scanning and the index input operation alternately, which makes operations complicated and leads to a low productivity.

Additionally, due to the separation of the recording operation from the search operation, incorrect data inputted by an incorrect operation must be modified following a search operation after the recording operation is terminated once, which requires a lot of operation steps and operation time.

Furthermore, in order to perform a batch operation for a plural images, it is possible to perform an operation for appending recognition marks to a plural images, finding images with the mark and performing a batch operation for the images. However, that kind of operation is very complicated since proceeding to next operation for rescanning of images or reinputting of indexes are needed after finishing a recording operation, proceeding a search operation, searching a requested image and checking the image whether the image is requested one.

This is also applied to an operation which converts a document to a typical file format of images. For example, in the case of outputting images in another document to an arbitrary record medium under the index input operation, lots of steps for operations and operation time are required.

SUMMARY OF THE INVENTION

In view of these problems, it is an object of the present invention to provide a file management system, a file management method, and a storage medium, which operabilities are improved.

According to one aspect of the present invention, there is provided a file management system in which a plurality of files can be stored and files can be searched for, comprising a list management means for arranging attribute information of recorded files, file search result information and index information of files per files and listing the information together in a single file list, an addition means for adding identical identification information to a plurality of files for which identical processing is requested to be performed in said file list, and a processing execution means for searching for files with said identification information in said file list and performing predetermined processing for the files which have been found.

BRIEF DESCRIPTION OF THE DRAWINGS

FIG. 4 is a diagram of a document list;

FIG. 5A is a diagram of a document list before a search operation;

FIG. 5B is a diagram of a document list after a search operation;

FIG. 6A is a diagram of a document list before a new record operation;

FIG. 6B is a diagram of a document list after a new record operation;

FIG. 7A is a diagram of a document list before a post-index operation of index information;

FIG. 7B is a diagram of a document list after a post-index operation of index information;

FIG. 8A is a diagram of a document list before a pre-index operation of index information;

FIG. 8B is a diagram of a document list after a pre-index operation of index information;

FIG. 9A is a diagram of a document list before an image record operation for pre-indexed information;

FIG. 9B is a diagram of a document list after an image record operation for pre-indexed information;

FIG. 10 is a diagram of an example of a document list attached file tags for non-indexed files FIG. 11 is a diagram of an example of a document list inputted index data for files attached file tags;

FIG. 15 is a diagram of an example of document list in the case of attaching file tags to files or images to be printed;

FIG. 23 is a diagram of an example of a document list when attaching file tags to files to newly store images;

FIG. 28 is a block diagram of a hardware constitution of a file management system according to the fourth embodiment of the present invention;

FIG. 34 is a flowchart diagram showing a processing part for storing all files into an export.

DETAILED DESCRIPTION OF THE PREFERRED EMBODIMENTS

A description of embodiments of the present invention with referring to figures will be made below.

[First Embodiment]

The first embodiment of the present invention is explained below with FIGS. 1 to 14.

(Hardware Constitution)

Figure 1:
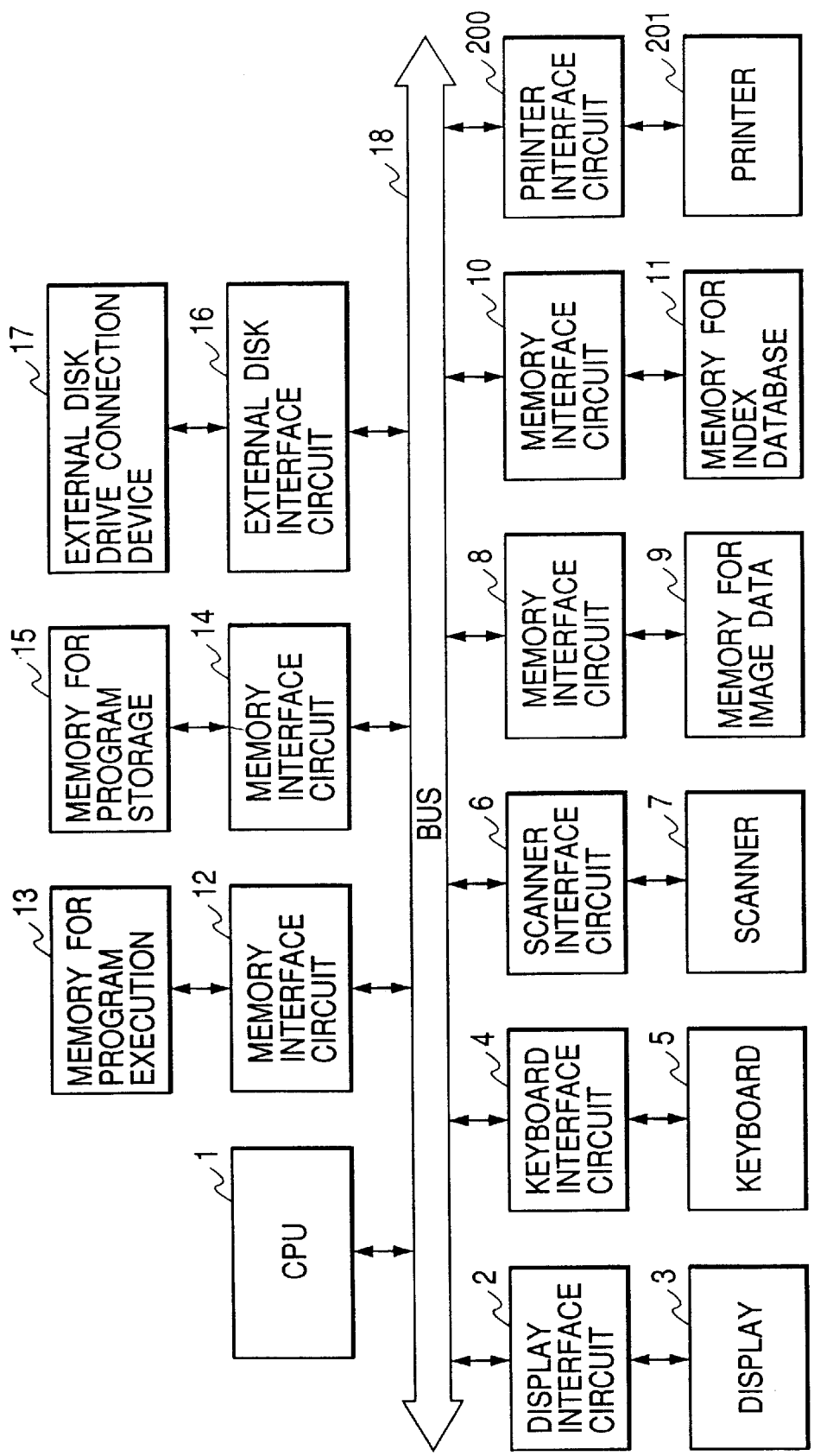
FIG. 1 is a block diagram of a hardware constitution of a file management system according to the first embodiment of the present invention.

Referring to FIG. 1, there is shown a block diagram of a constitution of a document management system according to the first embodiment. In this diagram, central processing unit (CPU) 1 controls the entire document management system and is connected to bus 18 for transmitting image information or instruction information of various operations.

CRT display 3, which displays an image of the image information or a document list for a user, is connected to bus 18 via display interface circuit 2. A keyboard or pointing device 5, which is used for a user to give instructions on various operations of the document management system, is connected to bus 18 via keyboard interface circuit 4.

Scanner 26, which reads image information from a subject, is connected to bus 18 via scanner interface circuit 6. A magnetic disk or optical magnetic disk (memory for an image data) 9, which is used for storing image information and identification information for managing each image information, is connected to bus 18 via a memory interface circuit 8.

Index database memory 11, in which is recorded a database for storing various index information which has been inputted by a user with being related to the image identification information, is connected to bus 18 via memory interface circuit 10.

RAM (a memory for a program execution) 13 used for running a program of a filing system is connected to bus 18 via a memory interface circuit 12. A magnetic disk or optical magnetic disk (a memory for a program storage) 15, which is used for storing the program of the filing system, is connected to bus 18 via memory interface circuit 14.

Disk drive (an external disk drive connection device) 17, which is used for connecting a floppy disk or the like in which the program of the filing system is stored, is connected to bus 18 via external disk interface circuit 16. Reference numeral 201 indicates a printer for printing image information, document lists or the like which relate to stored documents, the printer connecting to bus 18 via printer interface circuit 200.

A program for executing in a file management system is supplied by a floppy disk or the like. The program stored in the floppy disk is read from disk drive 17 and stored in magnetic disk 15. Afterward, the program is loaded into RAM 13 and executed by CPU 1.

(Software Processing)

Figure 2:
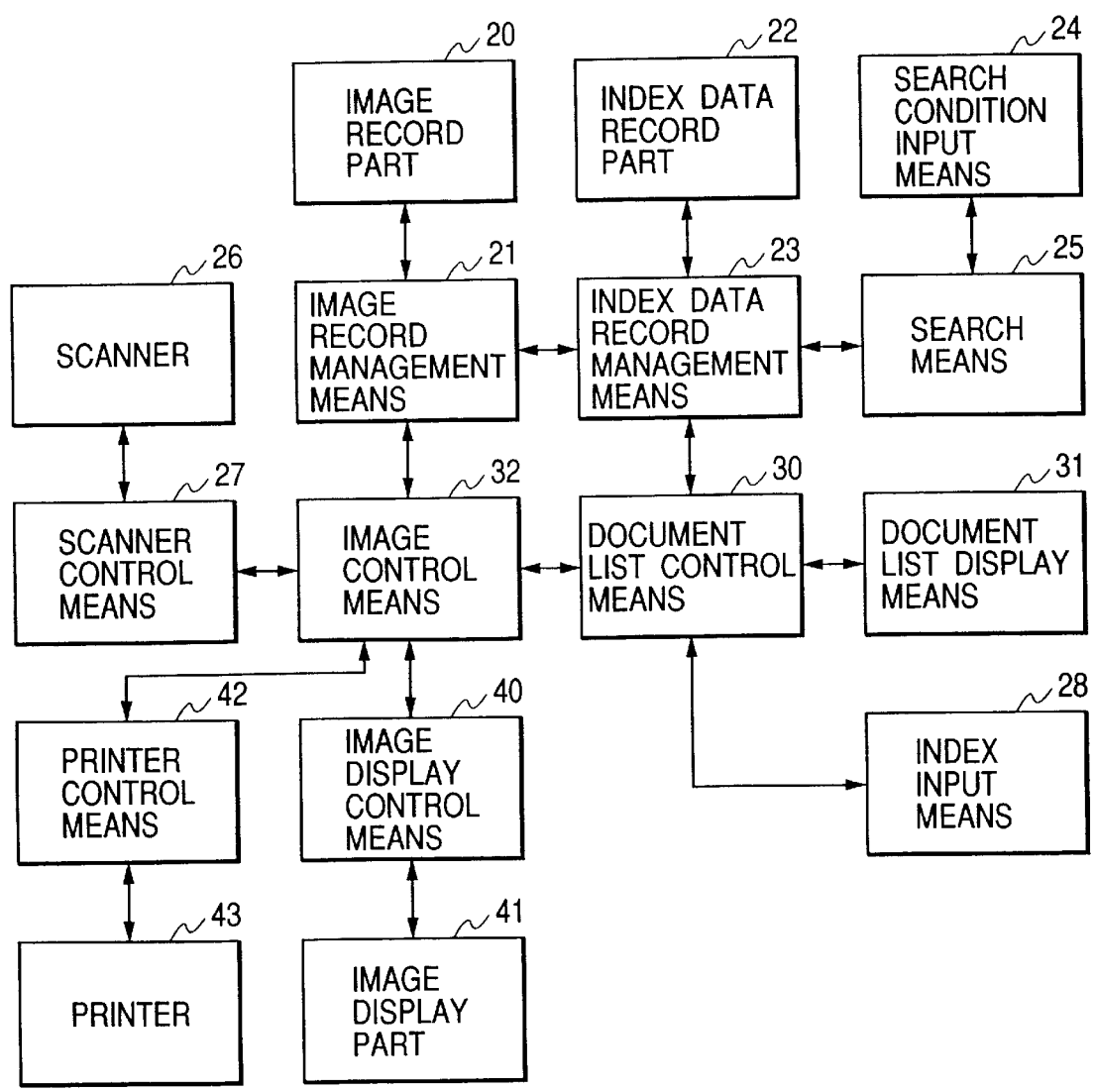
FIG. 2 is a diagram of various functions realized by file management processing in a file management system the hardware constitution.

Referring to FIG. 2, there is shown constituents of various functions embodied by file management processing in a file management system.

In this diagram, there are shown image record means 20 for recording an image as document information, image record management means 21 for managing data in image record means 20 with keeping consistency, and index data record means 22 for recording index data for searching for a document.

There are further shown index data record management means 23 for managing data in the index data record means 22 with keeping consistency, search condition input means 24 for inputting search conditions for a search for a desired document, and search part 25 for a search for the desired document from the database. Search condition input part 24 comprises a keyboard and a search condition input screen.

Scanner 26 is used for reading image data from a manuscript such as a drawing, scanner control means 27 is for controlling scanner 26, and index input means 28 is for inputting index data. Document list control means 30 controls document list display means 31 which displays a document list. Image control means 32 controls a document image and image display control means 40 controls image display means 41 to display the document image.

Document list control means 30 controls document list display means 31 and is connected to index data record management means 23, image control means 32, and index input means 28. Image control means 32 is connected to image record management means 21, document list control means 30, scanner control means 27, and image display control means 40. Reference numeral 42 indicates a printer control means to output image information of documents on record sheets by controlling printer 43, the printer control means connecting to image control means 32.

Figure 3:
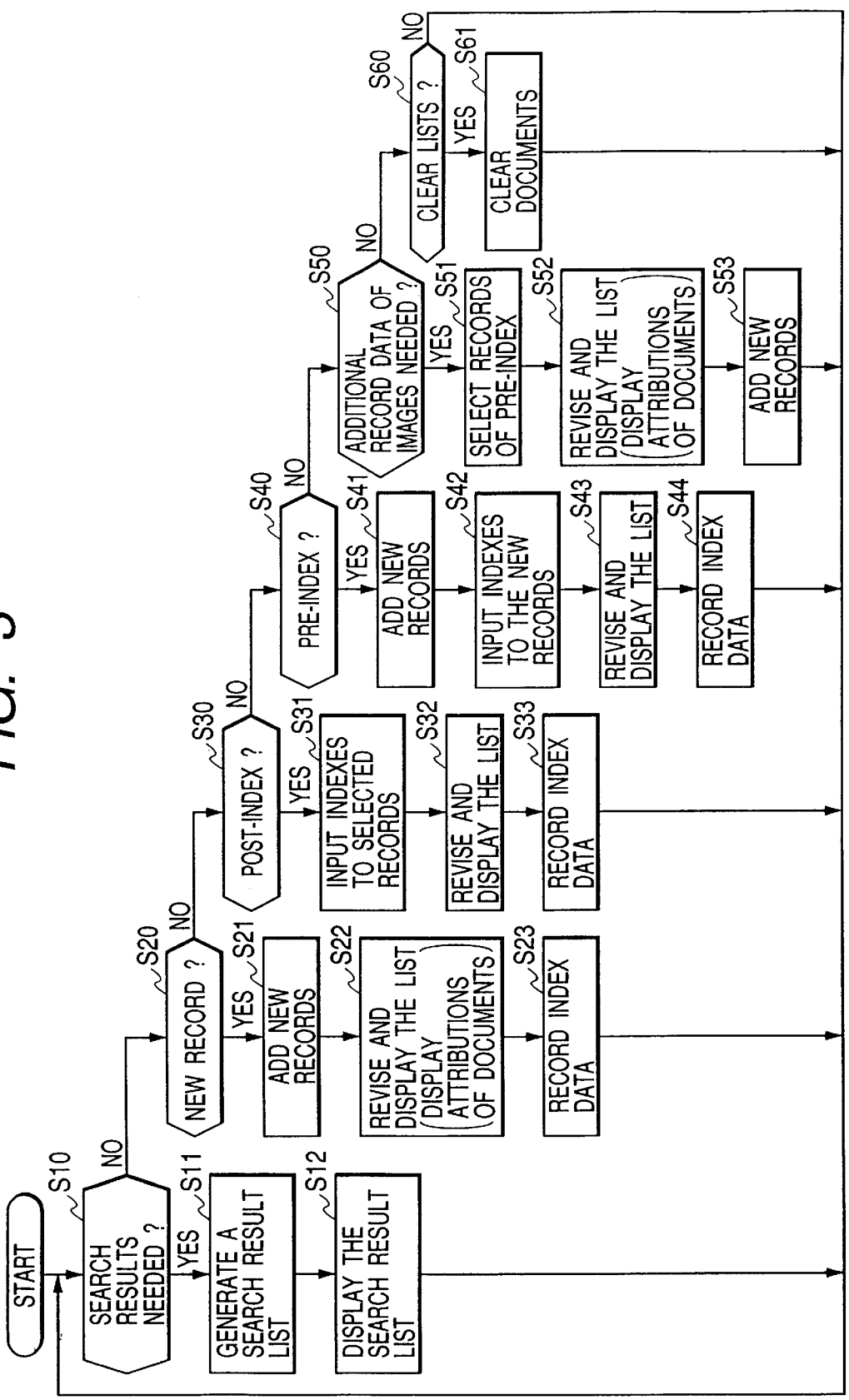
FIG. 3 is a flowchart diagram showing a control operation in a document list control means.

A description for document search will be made below with referring FIG. 3, document record, and index input operations in the document management system having the above constitution. FIG. 3 is a flowchart to show control operation of document list control means 30.

(Search Operation)

First, a user inputs search conditions for searching for a desired document from the search condition input means 24. As the search conditions, there are key words, for example. The inputted search conditions are transmitted to the search means (generally referred to as a search engine) 25 through index data record management means 23, and the search means 25 finds out a document which satisfies the search conditions from the document database via the index data record management means 23 for managing data of the index data record means 22 and outputs the result to the document list control means 30 (YES in S10). The document list control means 30 prepares a document list from the result(S11) and displays it to the document management list display means 31 generally comprising a CRT and CRT control circuit(S12).

(New Record)

A user starts the scanner control part 27 to read a new document from the scanner 26. The scanner 26 reads a content of a predetermined number of manuscript sheets and outputs the image data to the image control means 32. The image control means 32 records the image data into the image record means 20 via the image record management means 21 and reports new document creating information to the document list control means 30.

The document list control part 30 creates a new record on the basis of the new document creating information and adds it to the already displayed document list for a display (S21, S22). This record includes updated document attributes, e.g. an entry date and the number of pages, defined at scanning time. The updated document attributes are recorded into the index data record means 22 via index data record management means 23 (S23).

(Post-index)

A user designates start for inputting indexes to document list control means 30 (YES in S30). Document list control means 30 shifts a mode to receive output from index input means 28 by said designation. Next, the user inputs indexes from index input means 28 (S31). In this step, indexes are inputted as corresponding to said newly scanned document. Inputted indexes are displayed at a determined location in a document list with document list control means 30 (S32). Inputted index data is sent to index data recording part 22 and recorded through index data record management means 23 automatically, or in accordance with the user's designation through document list control means 30(S33).

(Pre-index)

It is possible to input index information prior to document input. Operation of said pre-index is explained as below.

A user instructs the document list control means 30 to perform an index pre-input operation (YES in S40). By this instruction, the document list control means 30 enables an index input which is currently not related to image data for a new record at the bottom of the document list (S41). Then, the user inputs a new index data from the index input means 28(S42). This data is displayed in the document list by the document list control part 30 (S43) and recorded into the index data record part 22 via the index data record management part 23, if necessary (S44).

(Recording Image for Index Pre-input Record)

A user inputs image data corresponding to the above index pre-input record (YES in S50). First, the user selects an index pre-input record for which the image data is inputted for the document list control means 30 (S51). Next, the image data is read from the scanner 26 with the scanner control means 27. The image data is sent to the image display part 41 via the image display control means 40 by the image control means 32 and sent to the image record management means 21 so as to be recorded into the image record part 20. The image record part 20 transmits address information of the recorded image to the document list control means 30 via the image control means 32 or directly.

Read-in information such as the number of document pages is sent from the image control means 32 to the document list control means 30. The document list control means 30 records this read-in information into the index data record part 22 via the index data record management means 23 and changes a status of the corresponding record in the document list from the index pre-input record to an ordinary document. Furthermore, the document list control means 30 updates a display of the document list (S52, S53). It is also possible for the system to have a constitution in which the address information of the recorded image is directly transmitted from the image record management means 21 to the index data record management means 23.

(Display and Print of Image Information)

A user can select an arbitrary files from a document list and designate to display and print their image information.

The user chooses an arbitrary file and designates displayed images with keyboard 5 or the like. By the designation, document list control means 30 obtains search information of images in chosen file from index data control part 22 via index data record part management means 23. Next, document list control means 30 sends search information and display designation for images to display control means 32. Image control means 32 obtains image information from image record part 20 via image record part management means 21 based on the search information for received images and sends the image information to image display part control means 40. Image information part control means 40 designates image display part 41 to display the received image information.

In the same manner, for printing image information, document list control means 30 receiving image information chosen by a user sends search information and print designation of images to display control means 32. Image control means 32 obtains image information from image record part 20 via image record part management means 21 based on the search information for received images and sends the image information to printer control means 42. Printer control means 42 designates printer 41 to print the received image information.

Next, the above description about said operations is explained in detail with examples of document lists.

(Constitution of Document List)

Referring to FIG. 4, there is shown a diagram of a display screen of the document list W. The document list W is created by the document list control part 30 and displayed on display 3. In this document list W, files as a search result and new files inputted from scanner 26 are displayed. A property column 51 indicates a file status, a file number column 52 indicates a number in the list, and columns 53, 54 and 56 indicate document index items. A column 55 indicates the number of pages of each file and a column 57 indicates an entry date when an image of a subject is recorded by scanner 26.

A user can freely design the index items according to a type of the document by using a database structure setting means which is not shown. In the example shown in FIG. 4, a Title item 53 for indicating a document title, a Chapter item 54 for indicating each end of chapters in a document, and a Rank item 56 for indicating an evaluation of a document are added as the index information for a document management. The order of these columns can be arbitrarily changed.

The document list W in FIG. 4 shows image recorded files and pre-index files each having only previously inputted index on the same screen in a manner in which a user can clearly distinguish between them. Icons 58 and 59 indicated in properties column 51 indicate states of respective files; icon 58 indicates that image information is already recorded in a file, icon 59 indicates that image information has not been recorded yet in a file and it is an pre-index file. Therefore, in the document list W in FIG. 4, it is easily understood that the files having file numbers 1 to 10 indicated by ranges 60 and 61 are image recorded files and that the files having file numbers 11 to 15 indicated by range 62 are pre-index files.

The files in the range 60 are existing files in which image information and index information are recorded, the files in the range 61 are new files in which image information is stored while index information is not inputted, and the files in the range 62 are pre-index files in which only index information is recorded.

(Search Operation)

Referring to FIGS. 5A and 5B, there is shown a diagram of a display screen for executing a search operation in the document list W. The document list W in FIG. 5A is an example of an initial status before performing search operation, including information for all stored document. If a user inputs "A" in the Rank column as a search condition in the search condition input means 24 at this point, the search means 25 finds out a record (file) satisfying the search condition from the index data record part 22 via the index data record management means 23 on the basis of the search condition and outputs the result to the document list control means 30. The document list control means 30 creates a document list based on the result and displays it in the document list display means 31. FIG. 5B shows a display screen of a document list W which has been created with this search operation and displayed.

(New Record)

Referring to FIGS. 6A and 6B, there is shown a document list W for executing a new record operation. A document list prior to a new record operation is shown in FIG. 6A. Now, a new document is read using scanner 26 and new document creating information is reported to the document list control means 30.

The document list control means 30 creates a new record on the basis of the new document creating information and adds it to the already displayed document list for a display. Created and updated document attributes are recorded into the index data record part 22 via the index data record management means 23. FIG. 6B shows a display screen of a document list W which is displayed after this recording operation of the new document. Records (files) having file numbers 4, 5, and 6 shown in FIG. 6B have been created and there are displayed the number of pages corresponding to the image information scan, entry dates, and icons in the properties column for indicating file attributes.

(Post-index)

Referring to FIGS. 7A and 7B, there is shown a diagram of a display screen for executing an index information post-input operation in the document list W. A user instructs the document list control means 30 to start an index input. This instruction causes the document list control means 30 to enter a mode for receiving an output from the index input means 28 as shown in FIG. 7A.

A user inputs a predetermined index from the index input means 28. The input index is displayed at a predetermined place in the list by the document list control means 30 and is recorded into the index data record part 22 via the index data record management means 23 automatically or by a user's instruction to the document list control means 30.

After a completion of an input operation of a single index item, it is possible to start an input operation of the next index item (in the next column on the right side, for example). In the same manner, after a completion of an index input operation into a single record (file), it is possible to start an index input operation into the next record (file) (in the next row of the list, for example). For example, an index input is started from the Title column of the file number 4 as shown in FIG. 7A and the index input operation is continuously performed up to the Rank column of the file number 6 as shown in FIG. 7B.

Furthermore, it is also possible to limit a specification of input columns to Chapter and Rank for a continuous input.
(Pre-index)

Referring to FIGS. 8A and 8B, there is shown a diagram of a display screen for executing an index information pre-input operation in the document list W. A user instructs the document list control means 30 to start an pre-index. This instruction causes the document list control means 30 to enable an index input currently not related to image data for the lowest new record in the document list as shown in FIG. 8A.

A user inputs new index data from the index input means 28. This data is displayed in the document list by the document list control means 30 and is recorded into the index data record part 22 via the index data record management means 23, if necessary.

After a completion of an input operation of a single index item, it is possible to start an input operation of the next index item. In the same manner, after a completion of an index input operation into a single record (file), it is possible to start an index input operation for the next record (file), and at this point a file not related to the image data is created as an index pre-input file. For example, an index input is started from the Title column of the new file as shown in FIG. 8A and the index input operation is continuously performed up to the Chapter column of the file number 9 as shown in FIG. 8B. The index pre-input files having the file numbers 7, 8, and 9 are created in this manner.

(Recording Image into Index Pre-input Record)

Referring to FIGS. 9A and 9B, there is shown a document list W for recording an image into a pre-input file of the index information. A user selects an pre-index record in which image data is to be inputted as shown in FIG. 9A for the document list control means 30, first.

The image data is read from the scanner 26 by the scanner control means 27. The image data is sent to the image display means 41 via the image display control means 40 by the image control means 32 and sent to the image record management means 21 so as to be recorded into the image record part 20. The image record part 20 transmits address information of the recorded image to the document list control part 30 via the image control means 32 or directly.

Read-in information such as the number of document pages is sent from the image control means 32 to the document list control means 30. The document list control means 30 records this read-in information into the index data record part 22 via the index data record management means 23 and changes a status of the corresponding record in the document list from the index pre-input record to an ordinary document.

Furthermore, the document list control means 30 updates a display of the document list. FIG. 9B shows a display screen of the document list W which has been created by this recording operation of the new document and displayed. Image information is inputted into the files having file numbers 7, 8, and 9 and the number of pages, the entry dates, and the icons of the Properties column for indicating file attributes are updated from icon 59 to icon 58 in the list.

On the basis of the examples of these document lists, an example operation is described below, attaching an identical mark to each desired file in the document list and performing a batch operation for said marked files. In the following description, a tag represents the identical mark. A file tag represents a tag marked on a file and a page tag represents a tag marked on pages included in the file.

Referring to FIG. 10, there is shown a diagram of an example of the document list W in which a file tag is appended to files in which no index data is inputted. On the document list shown in FIG. 10, each file already contains images whose amount is equivalent to the number of pages, though index data of the Title column and the Chapter column has not been inputted yet in files of file numbers 1, 2, 3, 5, 12, and 14. Icon 71 in the Properties column is a file tag indicating that the corresponding file is tagged. In FIG. 10, this file tag is appended to files in which index data has not been inputted yet.

Referring to FIG. 11, there is shown a diagram of an example of the document list W in which index data has already been inputted in the files tagged with the file tag. There is shown the document list W obtained as a result of inputting index data into the Index column and Chapter column sequentially for respective files tagged with the file tag.

Figure 12:
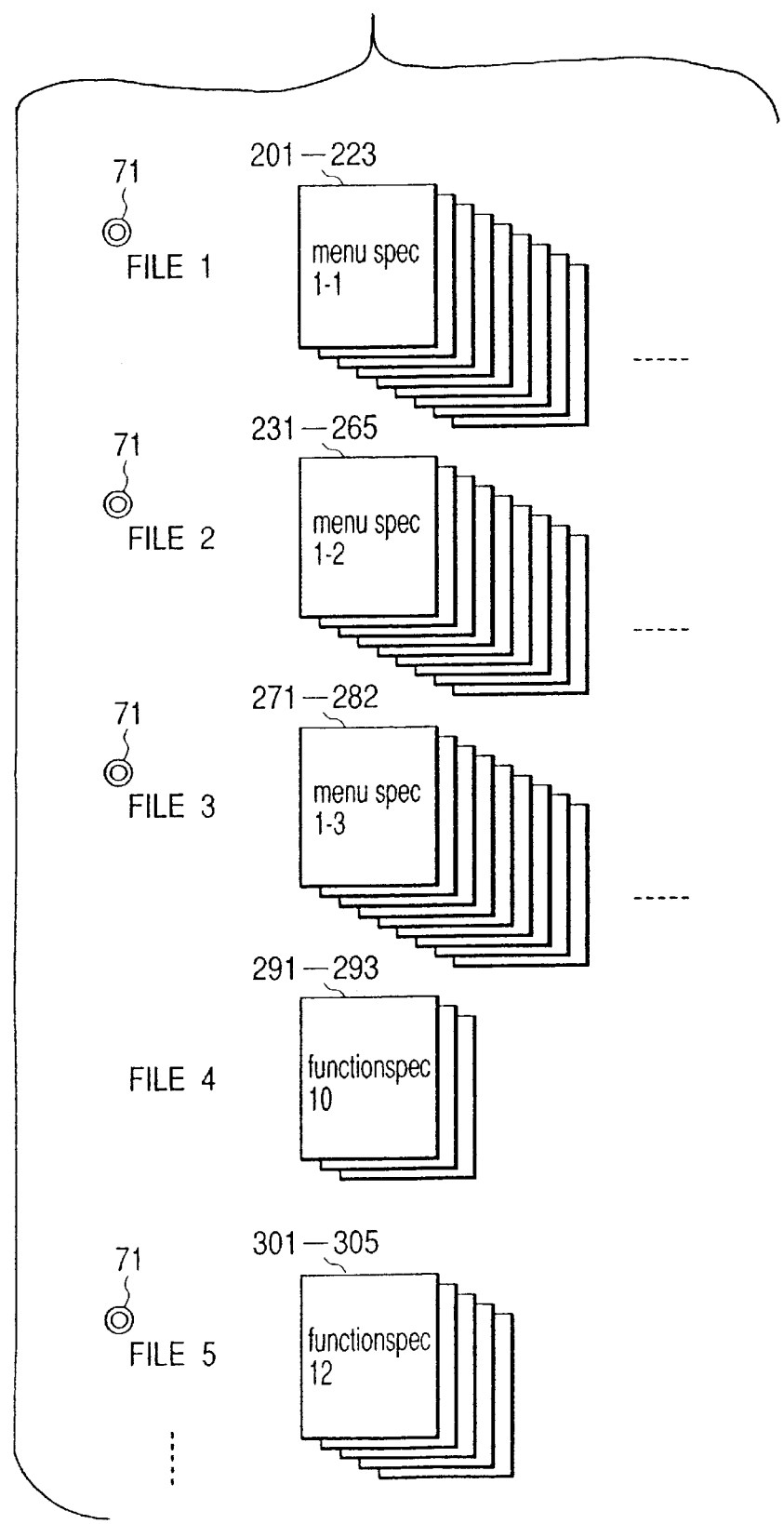
FIG. 12 is a diagram of an example of an image attached file tags to stored files per a file and recorded in image record part.

Referring to FIG. 12, there is shown a diagram of an example of images recorded in the image record part 20 with a file tag appended to each file for stored images. In FIG. 12, a file 1 contains images 201 to 223 with a file tag 71 being appended. Files 2, 3, and 5 contain images beginning with 231, 271, and 301, respectively in the same manner, with the file tag 71 appended to respective files. A file 4 contains images 291 to 293, without the file tag 71 appended.

Next, an operation procedure for a user in the first embodiment will be described by referring to FIGS. 13 and 14.

Figure 13:
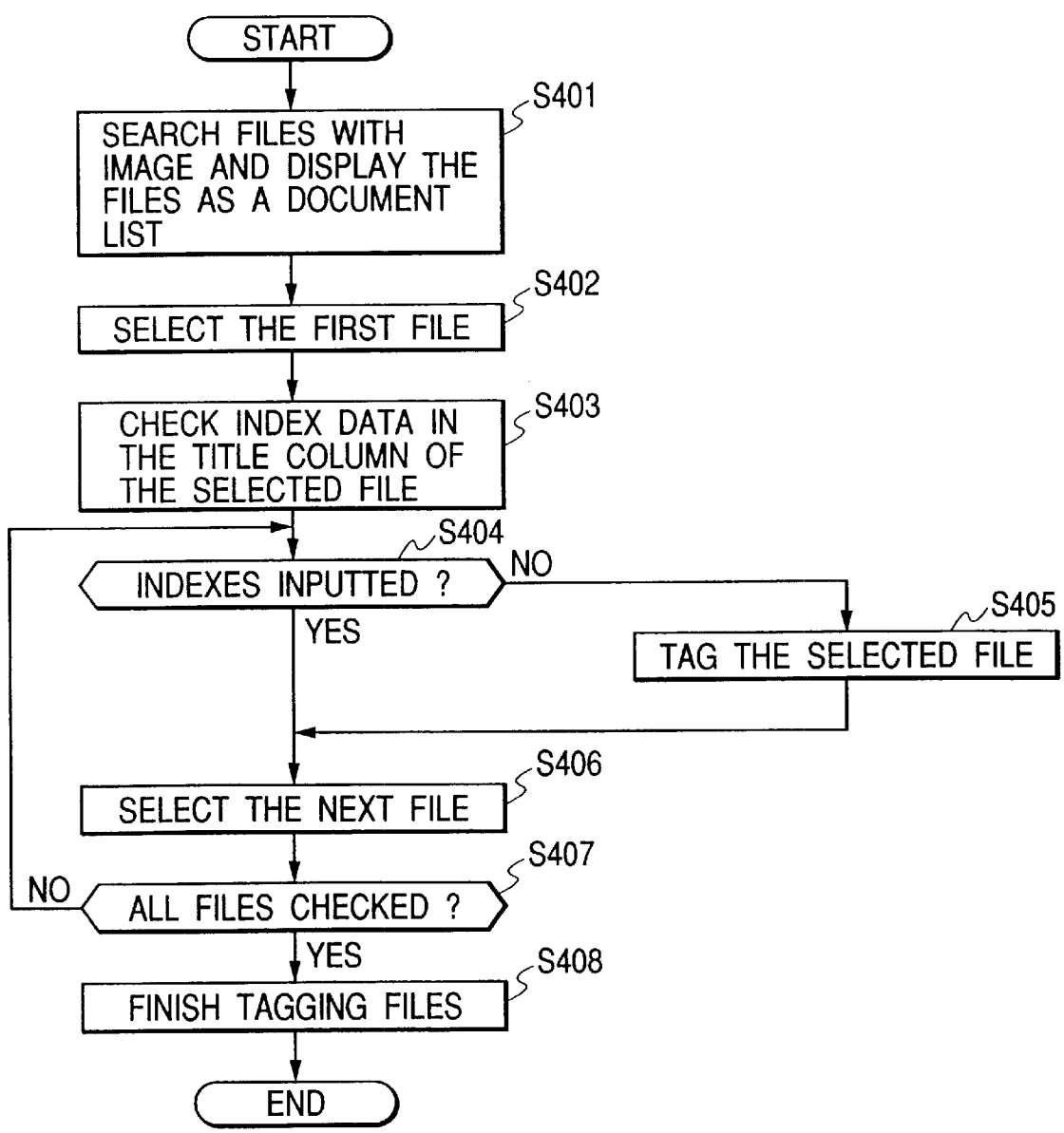
FIG. 13 is a flowchart diagram of a sequence of operations for attaching file tags for post-index to desired files which images has been stored.

Referring to FIG. 13, there is shown a flowchart of an operation procedure for tagging desired files in which images have already been stored with the file tag 71 used for post-indexing.

First in Step S401, files already containing images are searched for and displayed in the document list W. The first file is selected on the document list W in Step S402 and then it is checked that index data is inputted in the Title column of the selected file in Step 403. If index data is not inputted in the Title column in Step S404, the control progresses to Step S405 so as to tag the selected file with the file tag 71. By this operation, the file tag 71 is displayed for the selected file as shown in FIG. 10.

After a completion of the operation of tagging the selected file with the file tag 71 or if index data has already been inputted, the next file is selected on the document list W in Step S406. After repeating the steps S404 to S406 in order to perform this operation for subsequent files sequentially and checking that all files are tagged with the file tag in Step S407, the file tagging operation is terminated in Step S408.

Figure 14:
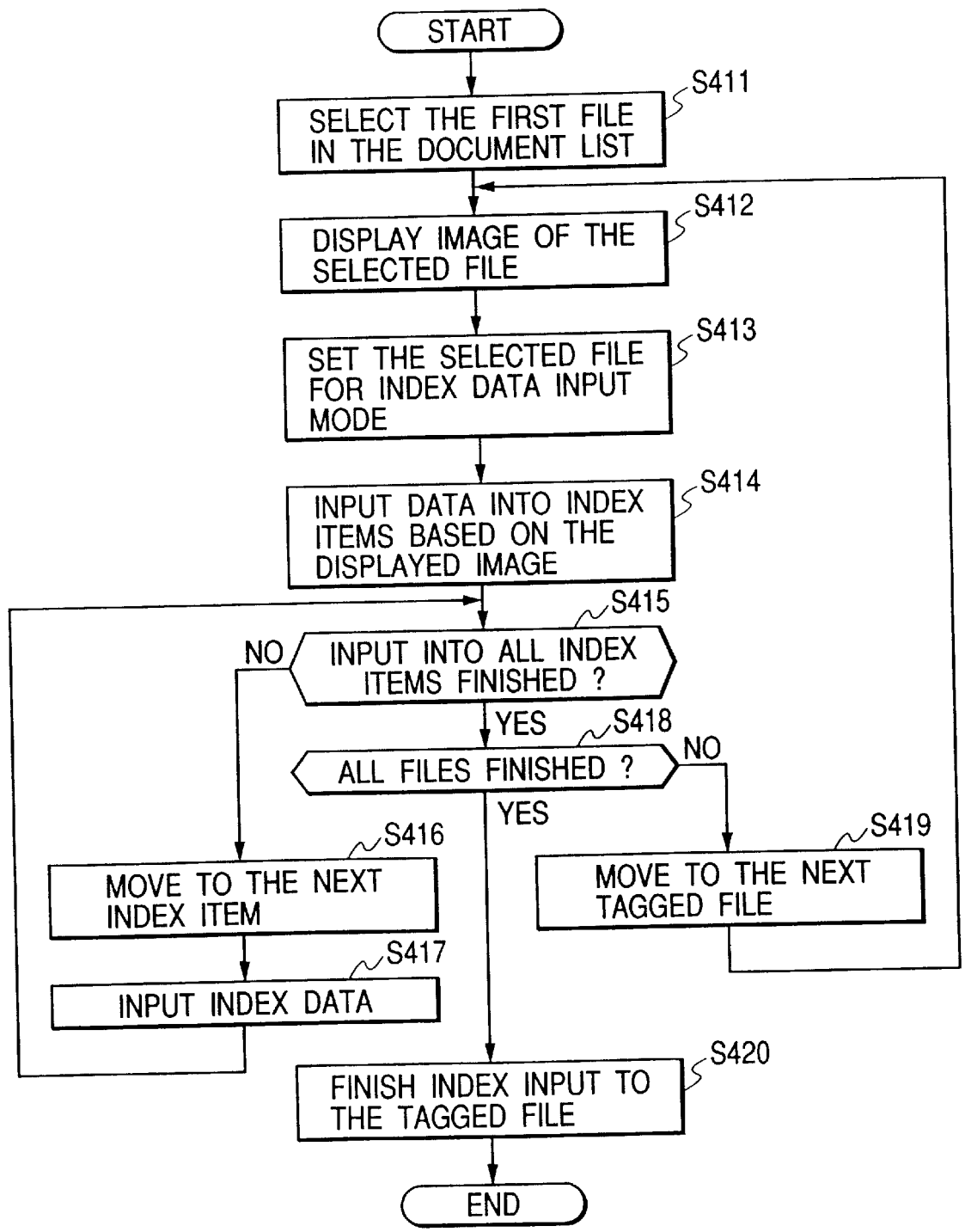
FIG. 14 is a flowchart diagram of a sequence of operations for inputting index data for files with file tags.

Referring to FIG. 14, there is shown a flowchart of an operation procedure for inputting index data sequentially for files tagged with the file tag 71.

First, the first file tagged with the file tag 71 are selected on the document list W in Step S411 and then the image on the first page (the image 201, 231, or the like in FIG. 12) of the selected file is displayed in Step S412. In Step S413, an index item of the file selected on the document list W is put in the index data input mode. In Step S414, index data is inputted in each index item on the basis of the contents of the displayed image (the image 201, 231, or the like in FIG. 12).

In the example shown in FIG. 12, for example, index data "menu spec" is inputted in the Title column of the file 1. After a completion of an input of a single index item, the input mode is shifted to the next index item in Step S416 via Step S415 and index data is inputted in Step S417. If index data has been inputted in all index items of files tagged with the file tag 71 (YES in S415), the control progresses to Step S418. If files tagged with the file tag 71 still remain (NO in S418), the control progresses to Step S419 so as to move to the next file tagged with the file tag 71 and to repeat the steps of Step S412 to Step S417. After a completion of the post-indexing operation for all files tagged with the file tag 71 (YES in S418), is terminated the index data input operation for the files tagged with the file tag 71.

As described above, files requiring an index input are tagged with the file tag 71 by using the document list W having the attribute information of the recorded files and the file search result information being integrated in the file management system in which files can be recorded or searched for. The post-indexing operation can be performed only for a plurality of files tagged with the file tag 71. Therefore, index data can be inputted continuously together for the plurality of files very efficiently.

Although the file tag is appended for a single file in each operation for the files displayed on the document list W in the first embodiment in the above, it is possible to select a plurality of files so as to be tagged with the file tag at a time instead of it.

In addition, it is possible to specify file numbers to tag files with the file tag.

Although the next file tag is searched for so as to move to the next file after a completion of an operation for a single file in performing a batch post-indexing operation for files tagged with the file tag in the above first embodiment, it is also possible to move automatically to the next file tagged with the next file tag after a completion of a single operation for a single file regarding to files tagged with a file tag instead of it.

In addition, although index data is inputted while displaying and checking each image in the operation procedure for inputting index data in the above first embodiment, it is also possible to create an index automatically on the basis of the contents of the document images and to input data automatically into index items by using the bar code or OCR analytical methods which have been already known instead of it.

[Second Embodiment]

Next, a description will be made below for a method of printing all files tagged with a file tag or all images of these files on a document list W at a time as a second embodiment of the present invention.

A constitution of the second embodiment is basically identical with that of the first embodiment, and therefore the constitution of the first embodiment is appropriated to the description of the second embodiment.

Referring to FIG. 15, there is shown a diagram of an example of a document list W in which files or images required to be printed are tagged with a file tag.

Each file contains images whose amount is equivalent to the displayed number of pages, and files 1, 2, 3, 5, 12, and 14 are tagged with a file tag 71. Icon 72 is a page tag for indicating that the file tag is appended to pages included in the file.

Figure 16:
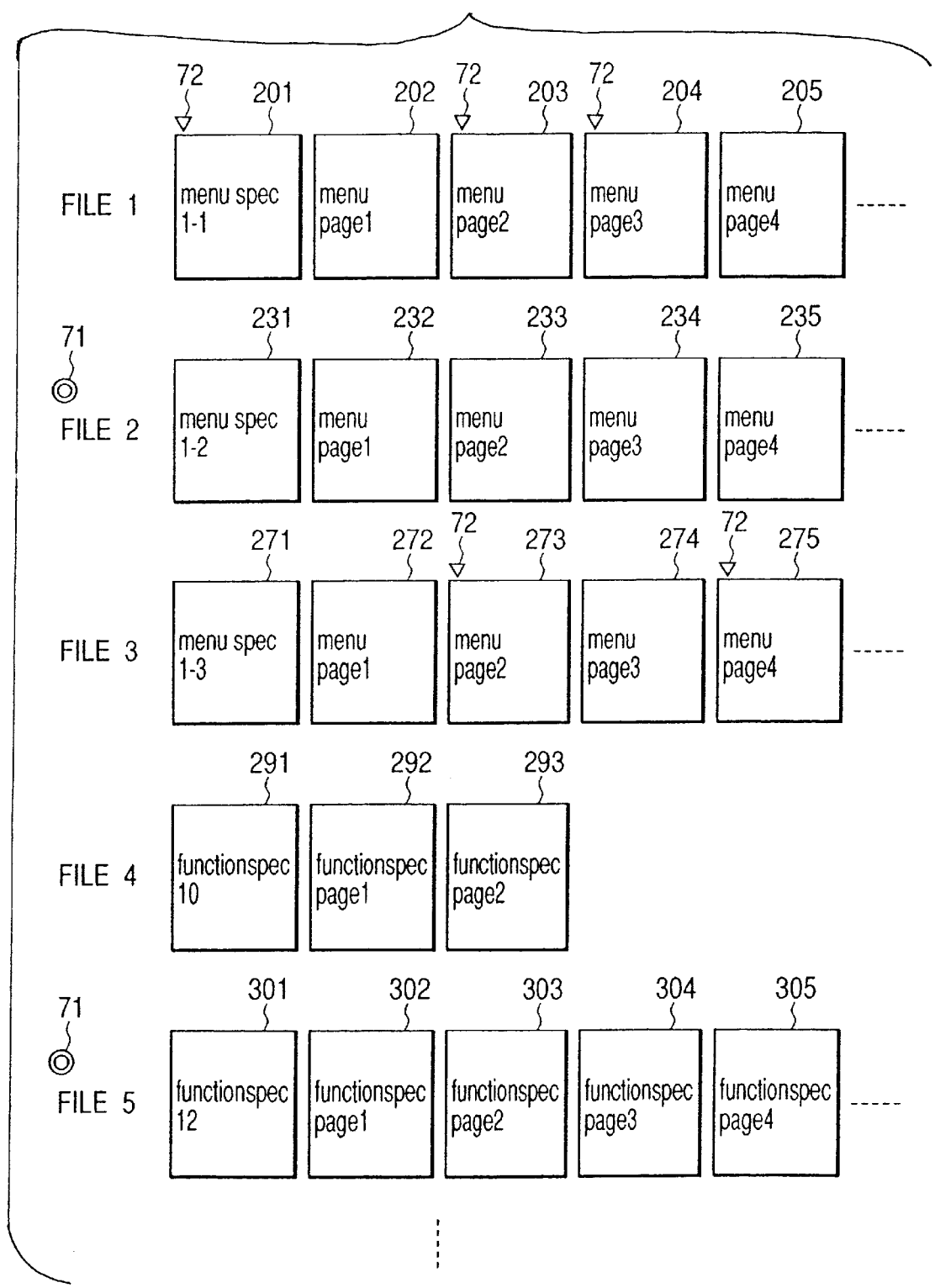
FIG. 16 is a diagram of an example of file tags and page tags in a file in which images are stored.

Referring to FIG. 16, there is shown a diagram of the file 1 to the file 5 each having images, being tagged with the file tag 71 and the page tags 72. Although the file 1 contains pages of images 201 to 223, only the first five pages are shown in FIG. 16 and only the images 201, 203, and 204 are tagged with the page tag 72. The file 2 is tagged with the file tag 71. Although the file 3 contains pages of images 271 to 283, only the first five pages are shown in FIG. 16 and the images 273 and 275 are tagged with the page tag 72. The file 4 is not tagged with any file tag. The file 5 is tagged with the file tag 71.

Figure 17:
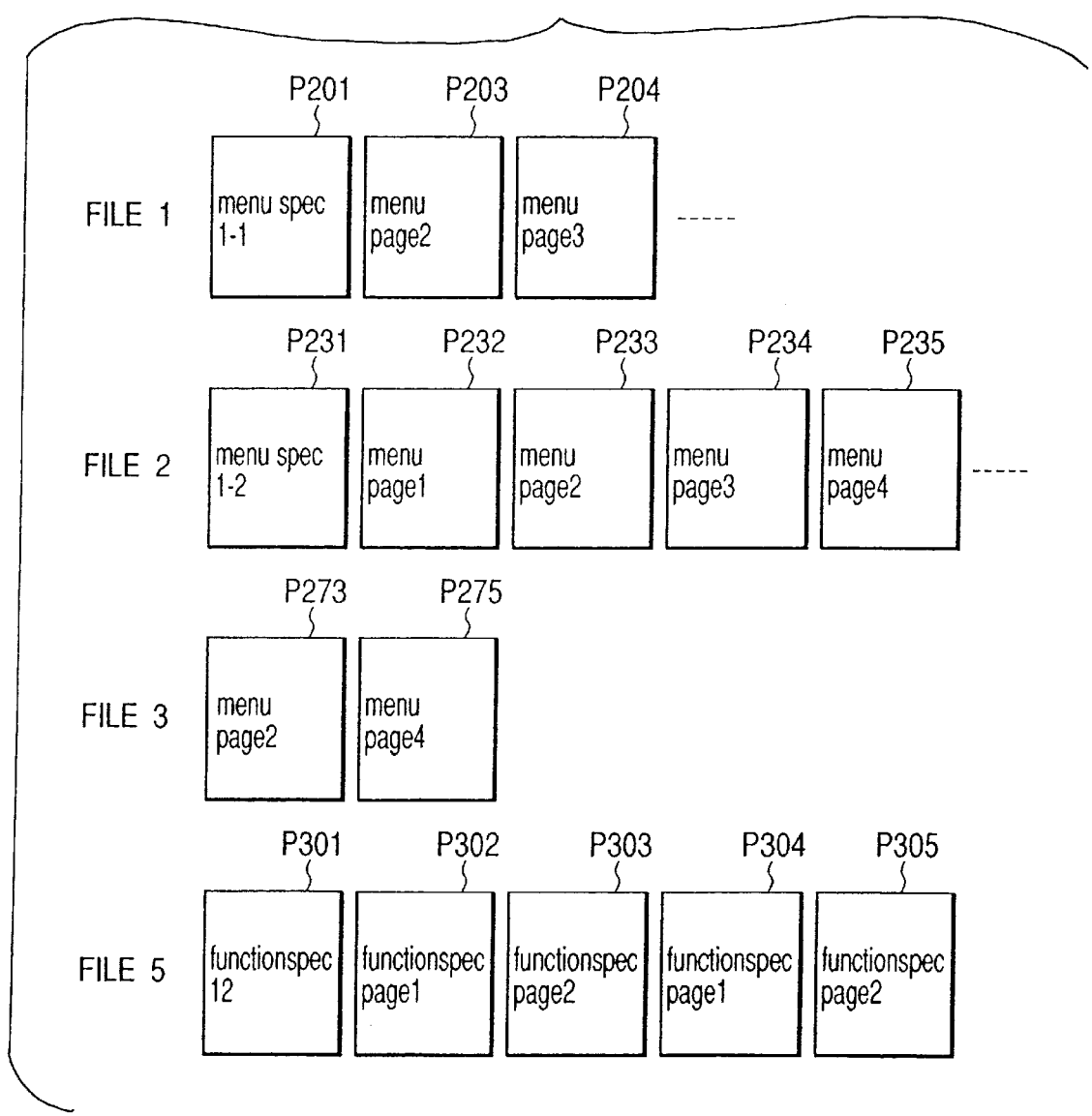
FIG. 17 is a diagram of output print of files and images with file tags and page tags in FIG. 16.

Referring to FIG. 17, there is shown a diagram of a print output of files or images tagged with the file tag 71 and the page tags 72 in FIG. 16.

In the file 1, the images 201, 203, and 204 tagged with the page tag 72 are printed, so that paper P201, P203, and P204 are output. In the file 2, all images are printed out since the file is tagged with the file tag 71, and paper P231 to P265 are output. In the file 3, the images 273 and 275 tagged with the page tag 72 are printed, so that paper P273 and P275 are output. In the file 4, no image is printed out since the file is not tagged. In the file 5, all images are printed out since the file is tagged with the file tag 71, so that paper P301 to P305 are output.

An operation procedure for a user in the second embodiment will be described below by referring to FIGS. 18 and 19.

Figure 18:
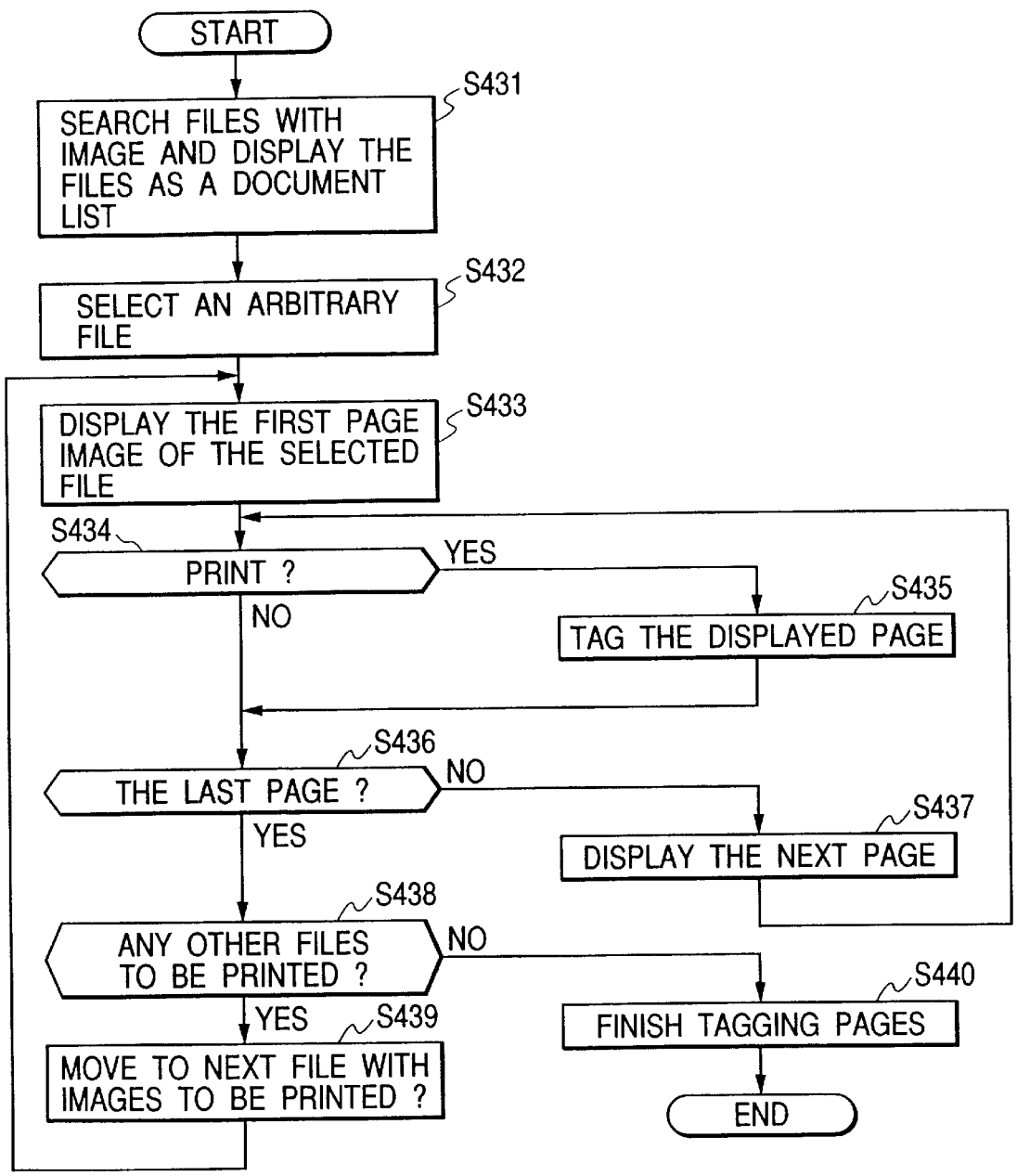
FIG. 18 is a flowchart diagram of operation sequence for attaching page tags to pages stored in a file.

Referring to FIG. 18, there is shown a flowchart of an operation procedure for tagging pages stored in a file with a page tag.

First, in Step S431, files containing images are displayed on the document list W. A desired file is selected in Step S432 and an image on the first page of the selected file is displayed to check that it is an image required to be printed in Step S433. If this image is required to be printed (YES in S434), the image on the page currently displayed is tagged with the page tag 72 in Step S435. If the tagging operation with the page tag 72 is completed, it is checked that the operation is finished to the last page of the file in Step S436. If the current page is not the last page, the next page is displayed in Step S437, and Step S434 to Step S437 are repeated. If the processing reached the last page of the file (YES in S436), it is checked that there are any other files to be printed in Step S438. If there are those files, a file containing images required to be printed next is selected in Step S439, and Step S433 to Step S439 are repeated. If there are not files to be printed (NO in S438), the page tagging operation is terminated in Step S440.

Figure 19:
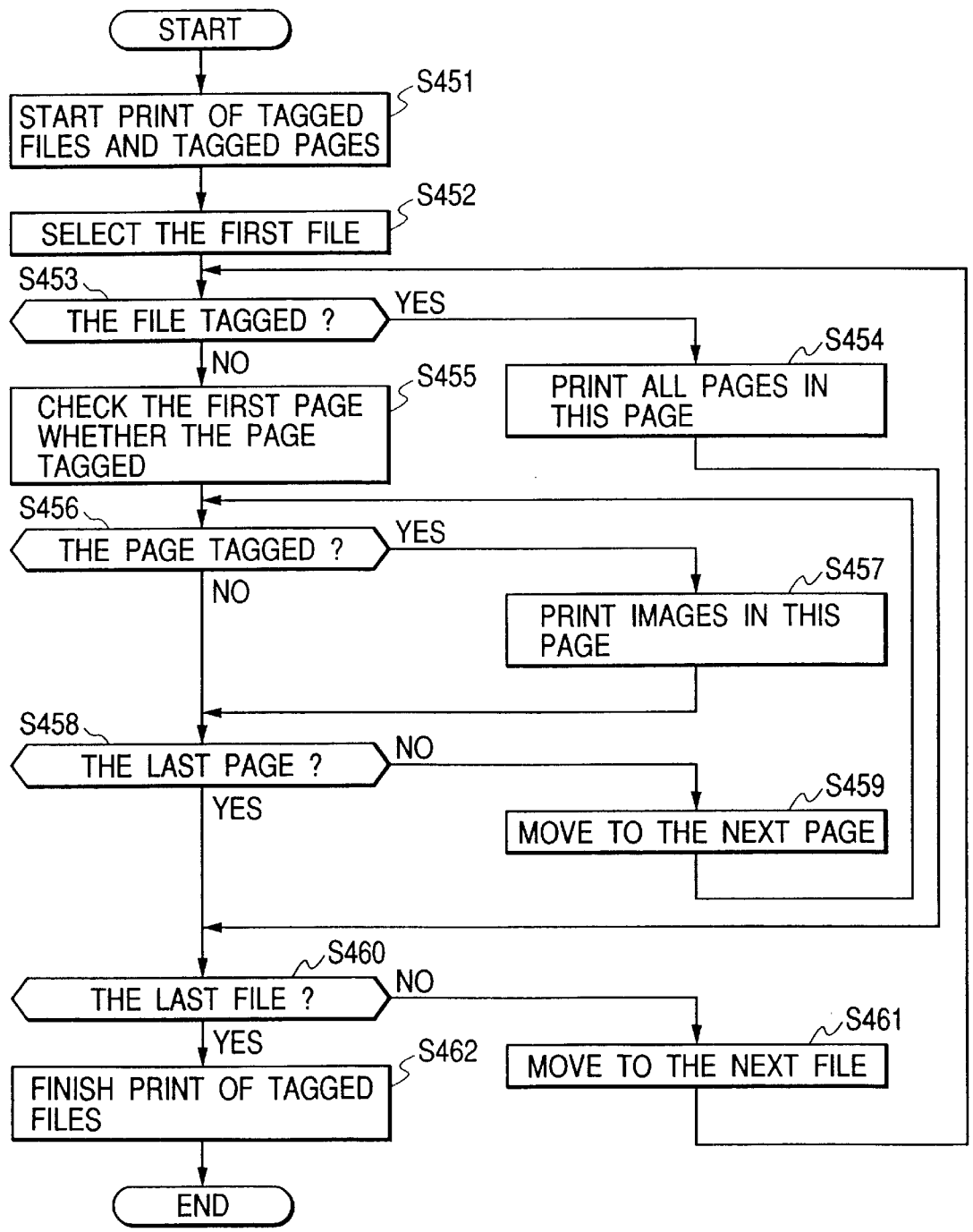
FIG. 19 is a flowchart diagram of operation sequence for printing files with file tags or pages with page tags in a document list.

Referring to FIG. 19, there is shown a flowchart of an operation procedure for printing files tagged with the file tag 71 or pages tagged with the page tag 72 on the document list W. Files with the file tag and pages with the page tag are printed in Step S451, and then the first file is selected (S452). It is judged whether or not the selected file is tagged with a file tag in Step S453; if it is tagged with a file tag, all pages of this file are printed in Step S454. If the file is not tagged with the file tag 71, the first page of the corresponding file is checked in Step S455. If it is judged to be a page tagged with a page tag (YES in S456), an image on this page is printed in Step S457. Subsequently, unless the current page is the last one in Step S458, the control progresses to the next page in Step S459, and Step S456 to Step S459 are repeated. If the operation has reached to the last page, it is judged whether or not the current file is the last file on the document list W in Step S460. Unless it is the last file, the control progresses to the next file in Step S461, and Step S453 to Step S461 are repeated. If it is the last file, is terminated the printing operation for the files tagged with the file tag 71 or the pages tagged with the page tag 72 in Step S462.

In management means for storing and managing documents, stored images may be sometimes replaced with new ones. This operation is referred to as an image revision. In this operation, the old images can be stored as revised images (revised pages) without deleting the old images in some cases. A page tag in the present invention has the same effects as those described in the above even if they are appended to the revised pages. A procedure for batch printing with the revised pages being tagged with a page tag is described below by referring to FIGS. 20 to 22.

Figure 20:
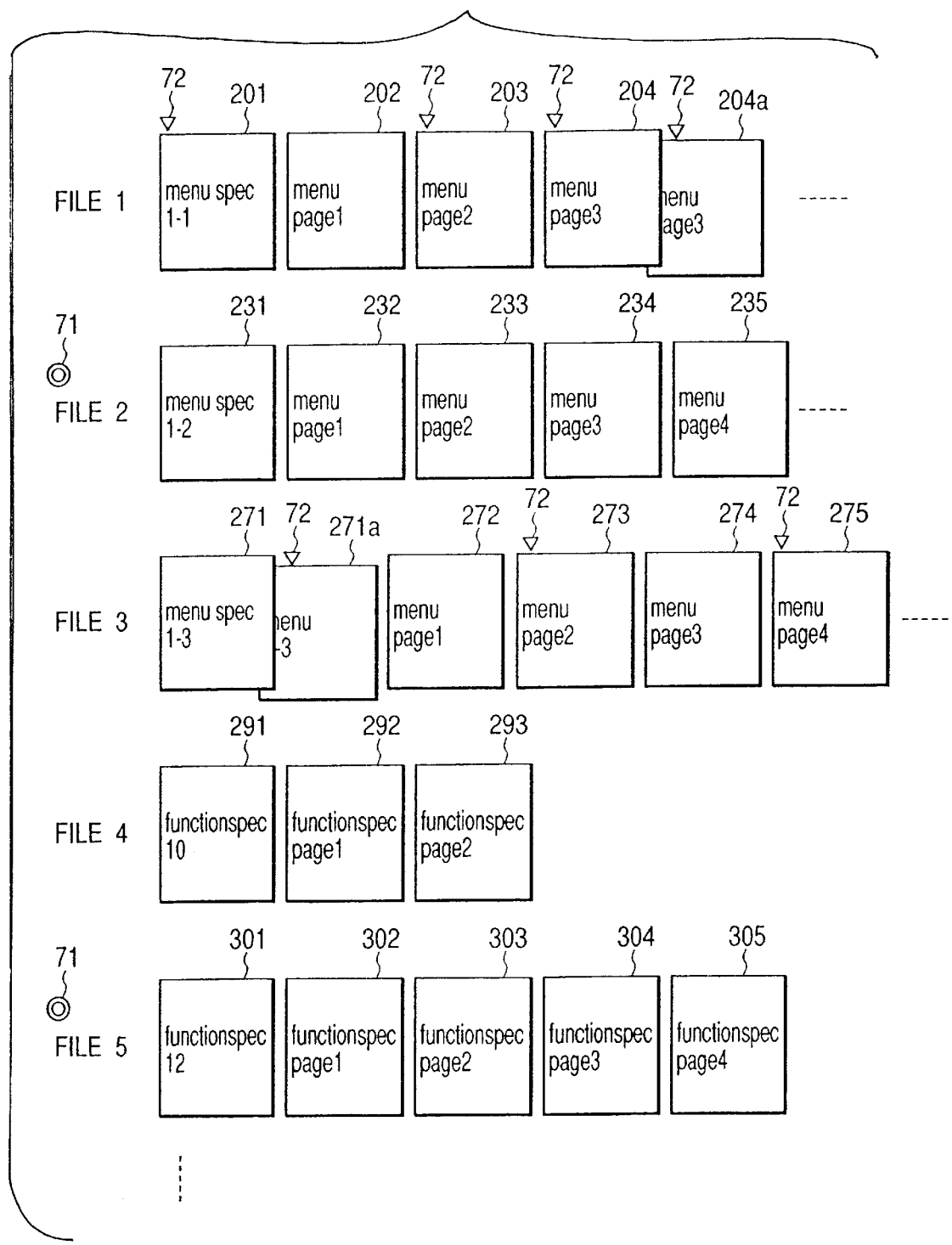
FIG. 20 is a diagram of an image when attaching page tags in a file with revised page.

Referring to FIG. 20, there is shown a diagram of files having revised pages tagged with the page tag 72.

A revised page of an image 204 is an image 204*a* and a revised page of an image 271 is an image 271*a*, and both of the revised pages are tagged with a page tag 72.

Figure 21:
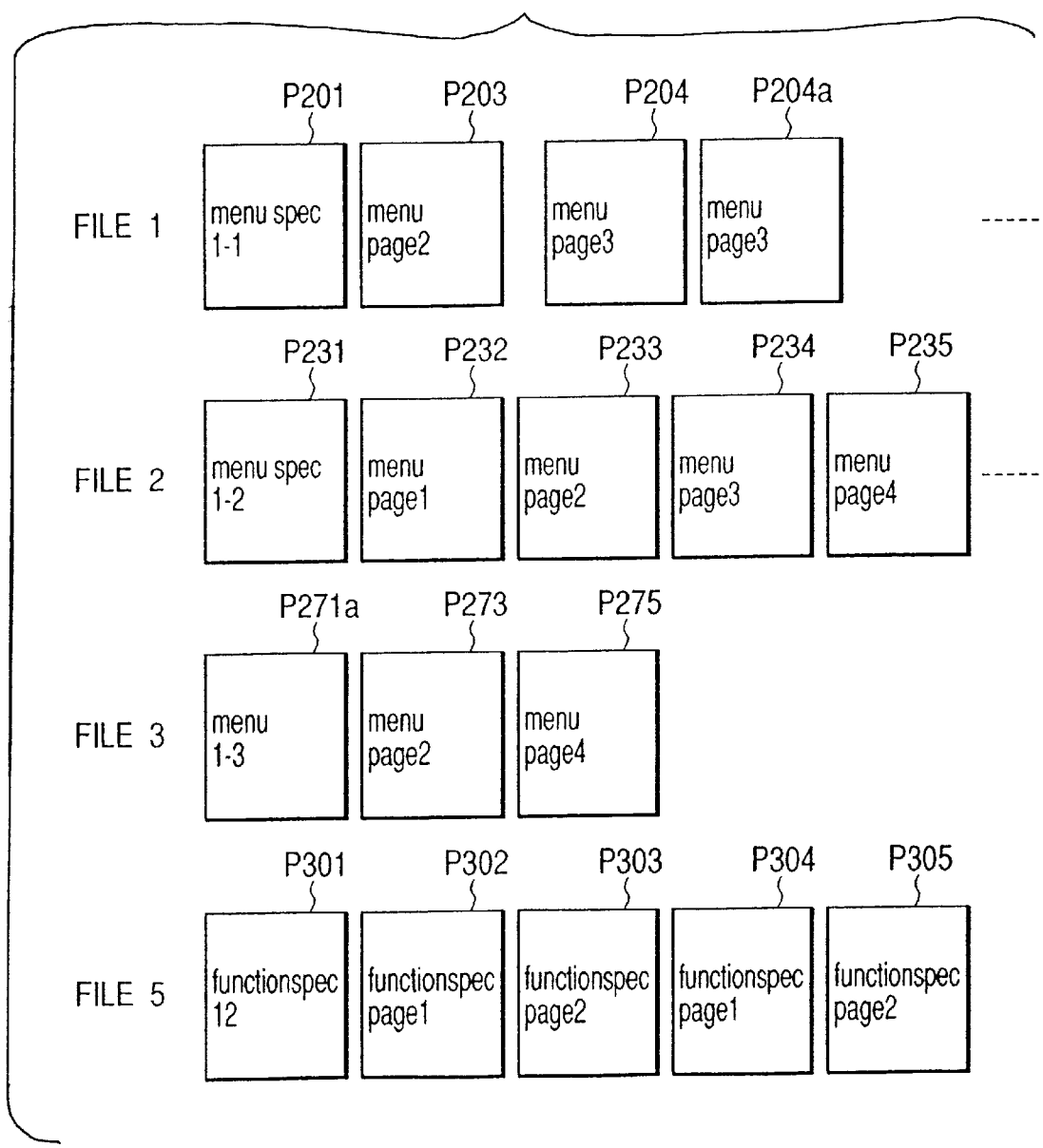
FIG. 21 is a diagram of output print of files and images with file tags and page tags in FIG. 20.

Referring to FIG. 21, there is shown a diagram of a print output of files and images tagged with the file tag 71 and with page tags 72 in FIG. 20.

Paper P204 is printed out for the image 204 and paper P204*a* is for the revised page 204*a*. For the revised page 271*a*, paper P271*a* is printed out.

Figure 22:
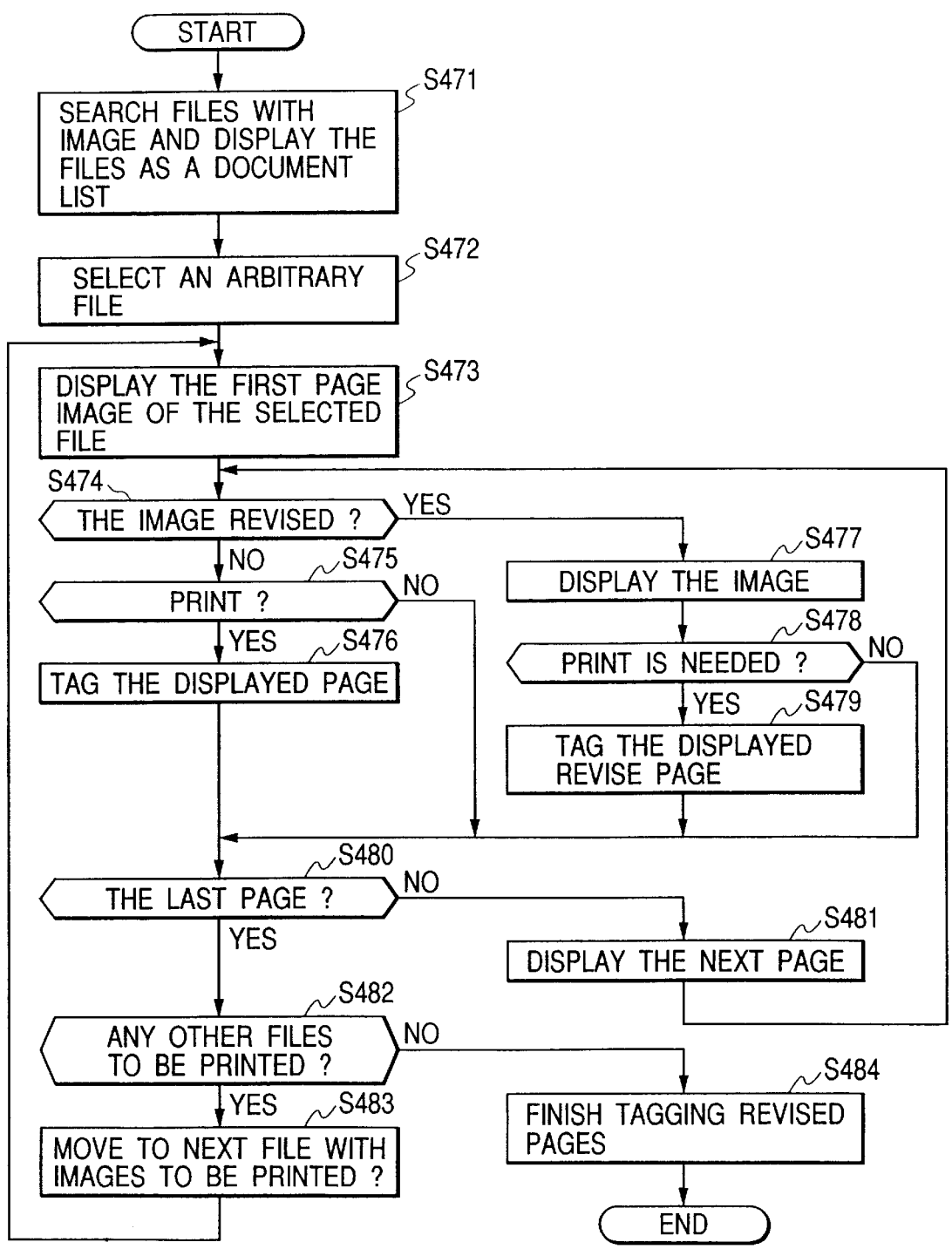
FIG. 22 is a flowchart diagram of operation sequence for attaching page tags to revised pages.

Referring to FIG. 22, there is shown a flowchart of an operation procedure for tagging a revised page with the page tag 72.

A file containing images are displayed on the document list W in Step S471, a desired file is selected in Step S472, and an image on the first page of the selected file is displayed in Step S473. In Step S474, it is judged whether or not the image on the page is revised. If it is not revised, whether or not the image is to be printed is judged in Step S475. If it is required to be printed, the displayed image is tagged with the page tag 72 in Step S476.

If the image on the page is revised (YES in S474), the revised page is displayed in Step S477 and whether or not the image is to be printed is judged in Step S478. If the image is required to be printed (YES in S478), the displayed revised page is tagged with the page tag 72 in Step S479.

Next, it is checked that the last page of the corresponding file is selected in Step S480. If the last page is not selected, a page displayed for a selection is shifted to the next page in Step S481 and then Step S474 to Step S481 are repeated. If the last page is selected (YES in S480), it is checked that there are any other files to be printed in Step S482. If there are those files, a file containing images required to be printed next is selected in Step S483 and Step S473 to Step S482 are repeated. If there are not files to be printed, the page tagging operation is terminated in Step S484.

Regarding the revised pages described above, a plurality of revised pages may exist as a result of a plurality of revisions for a single page image. If so, they can also be processed at a time by being tagged with the page tag 72 in the same operation.

As described above, files on a document list W are tagged with a file tag and pages included therein are tagged with a page tag by using the document list W having attribute information of the recorded files and file search result information being integrated in the file management system in which files can be recorded or searched for. Then, files tagged with the file tag and pages with the page tag are searched for and those are printed. By this operation, batch printing processing can be easily performed.

[Third Embodiment]

A description will be made below for a method of scanning images for files tagged with a file tag on a document list W so as to store new images at a time as a third embodiment of the present invention.

The document list W contains new files, pre-indexed files, and image containing files together. If new images are stored after scanning in these files, storing operations need to be varied in accordance with types of the files in which the images are stored. For example, a storage of a new image into an image containing file is treated as an additional scan and a storage of a new image into a pre-indexed file is treated as a new scan. To avoid performing storing operations varied in accordance with types of the files in which the images will be stored, files in which new images will be stored are tagged with a file tag on the same document list W in the third embodiment, so that these images are stored at a time independently of types of the files in which the images will be stored.

Referring to FIG. 23, there is shown a diagram of an example of the document list W containing files in which new images will be stored are tagged with a file tag.

Files 1 to 11 having an icon 58 are image containing files and files 12 to 14 having an icon 59 are pre-indexed files in which no image is stored. A file tag 71 is appended to the Properties column for the files 1, 2, 3, 8, 12, and 13.

In the third embodiment, a description will be made for an example of storing a new image of a single page in files tagged with the file tag 71 sequentially.

Figure 24:
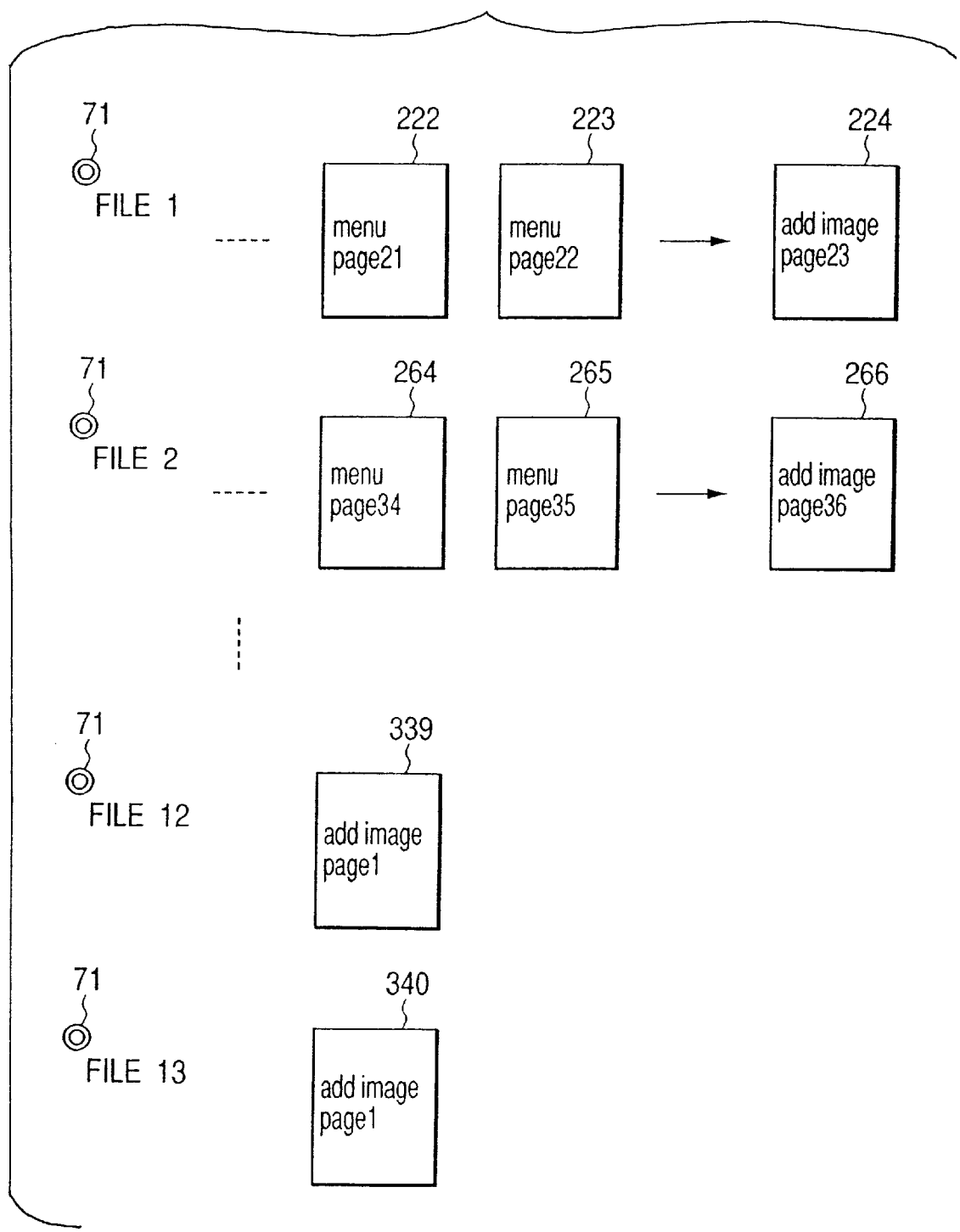
FIG. 24 is a diagram of a condition storing images by additional or new scan for files with file tags in a document list in FIG. 23.

Referring to FIG. 24, there is shown a diagram of illustrating a condition that a new image is stored with an additional scan or a new scan into files tagged with the file tag 71 on the document list W in FIG. 23.

A file 1 is tagged with the file tag 71, and therefore a new image 224 is added subsequently to the last image 223. Also in a file 2, a new image 266 is added in the same manner. A file 12 is a pre-indexed file in which no image is stored, and therefore no image is added, but a new image 339 is stored in the file 12. Also in a file 13, a new image 340 is stored in the same manner.

Figure 25:
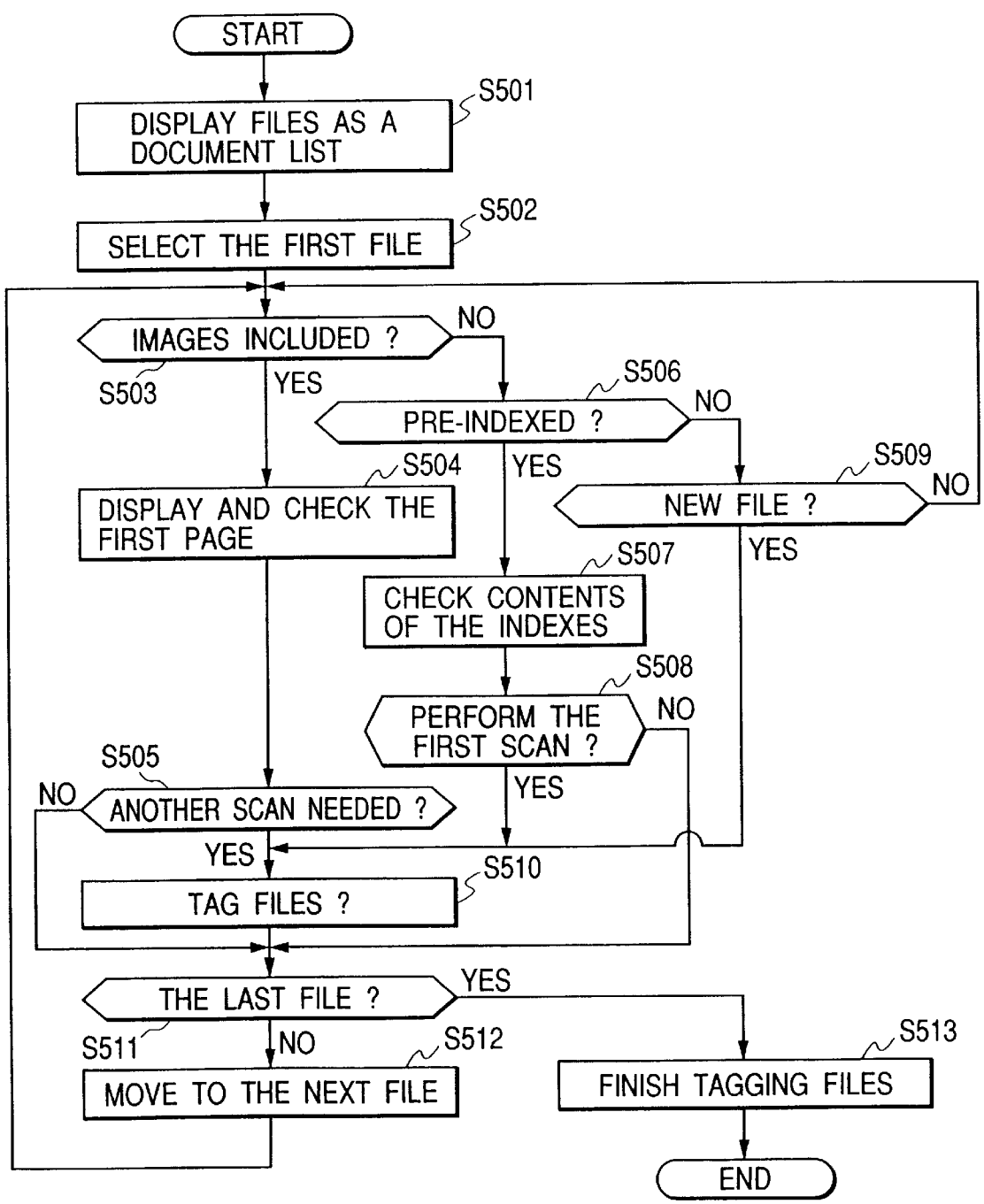
FIG. 25 is a flowchart diagram of operation sequence for attaching file tags to files with images, pre-indexed files and new files.

Referring to FIG. 25, there is shown a flowchart of an operation procedure for tagging image containing files, pre-indexed files, and new files with a file tag.

A file found by a search operation is displayed on the document list W in Step S501 and the first file on the document list W is selected in Step S502. In Step S503, it is judged whether or not the selected file is an image containing file. If it is determined to be an image containing file, the first page of the file is displayed to check the content of the image (S504). If it is determined that an additional scan for an image is needed as a result of the check (YES in S505), the file is tagged with the file tag 71 in Step S510.

If the selected file is not an image containing file (NO in S503), it is judged whether or not the selected file is a pre-indexed file. If it is a pre-indexed file, the contents of the pre-inputted indexes are checked in Step S507. If it is determined that a new scan for an image is required as a result (YES in S508), the file is tagged with the file tag 71 in Step S510.

If the selected file is not a pre-indexed file (NO in S506), it is judged whether or not it is a new file. If it is judged to be a new file, the file is tagged with a file tag to perform a new scan for the image in Step S510.

It is judged whether or not the selected file is the last file of the document list W in Step S511. If it is judged not to be the last file, the next file is selected in the document list W in Step S512 and the control returns to Step S503. If it is the last file, the file is tagged with a file tag in Step S513.

Figure 26:
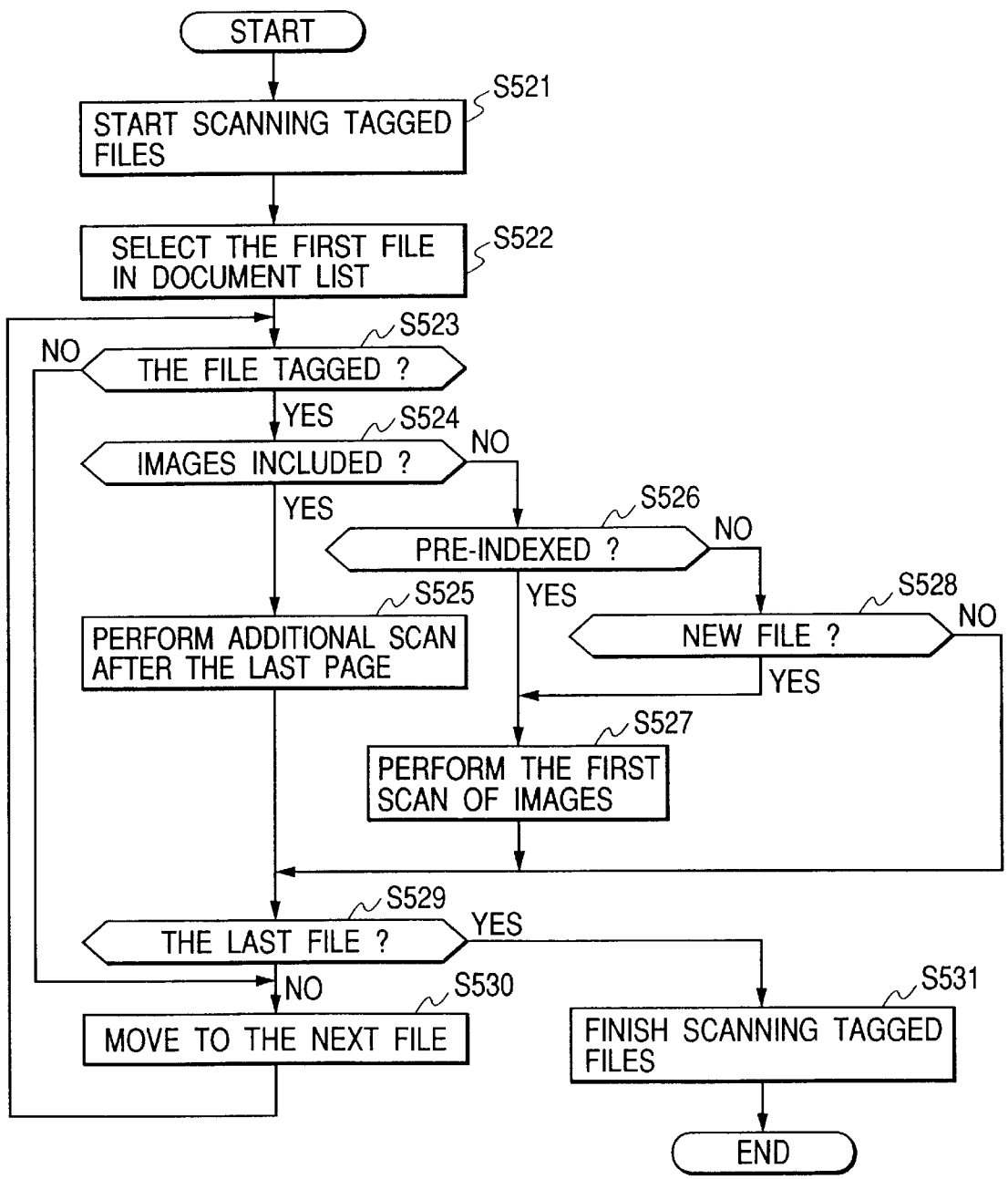
FIG. 26 is a flowchart diagram showing a scan operation when scanning images per a page in files with file tags in a document list.
Figure 27A:
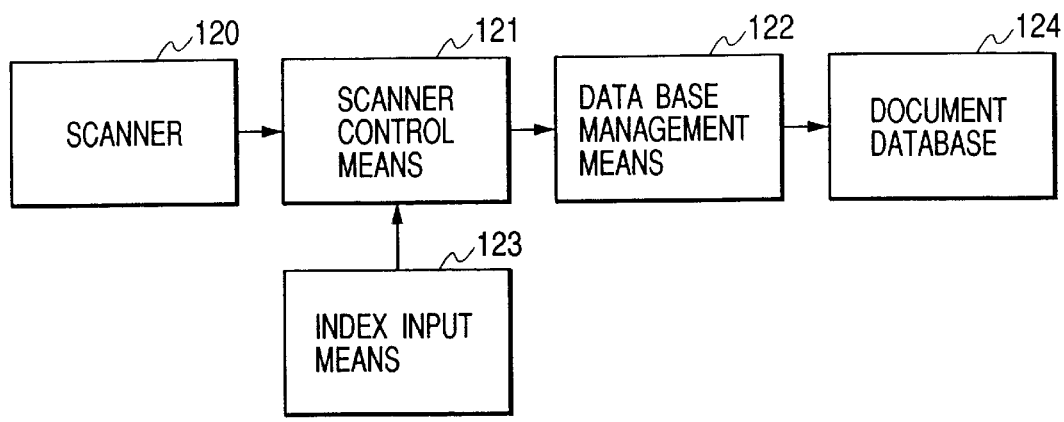
FIG. 27A is a block diagram of a condition for scanning manuscripts by a scanner and a constitution of a conventional image filing system in the case of storing images.
Figure 27B:
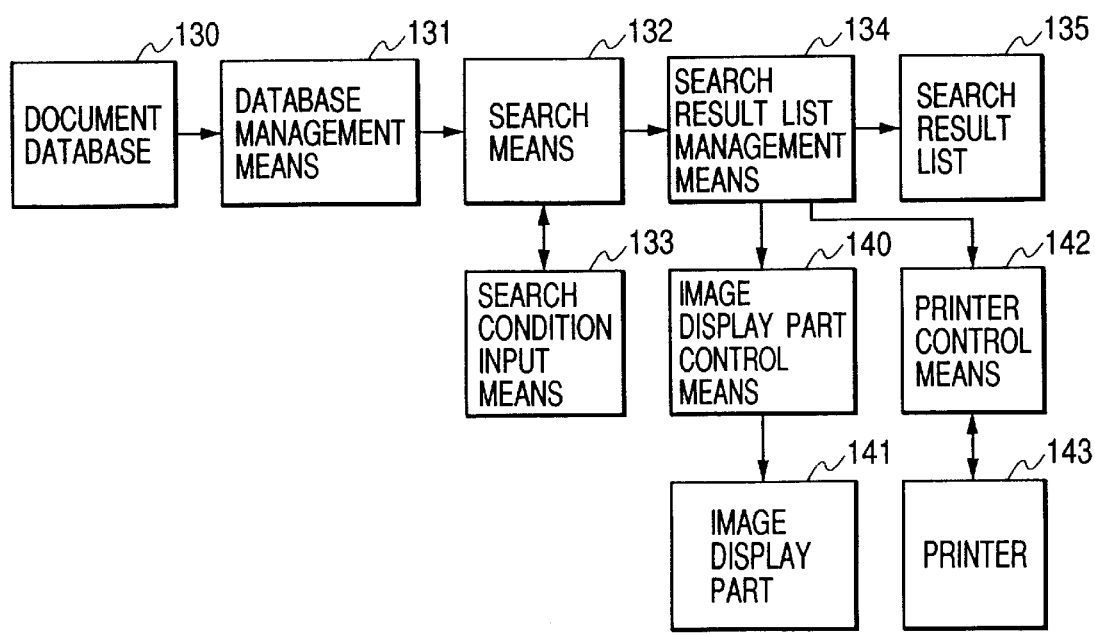
FIG. 27B is a block diagram of a constitution of a conventional image filing system in the case of searching for desired images with search means in document database.
Figure 29:
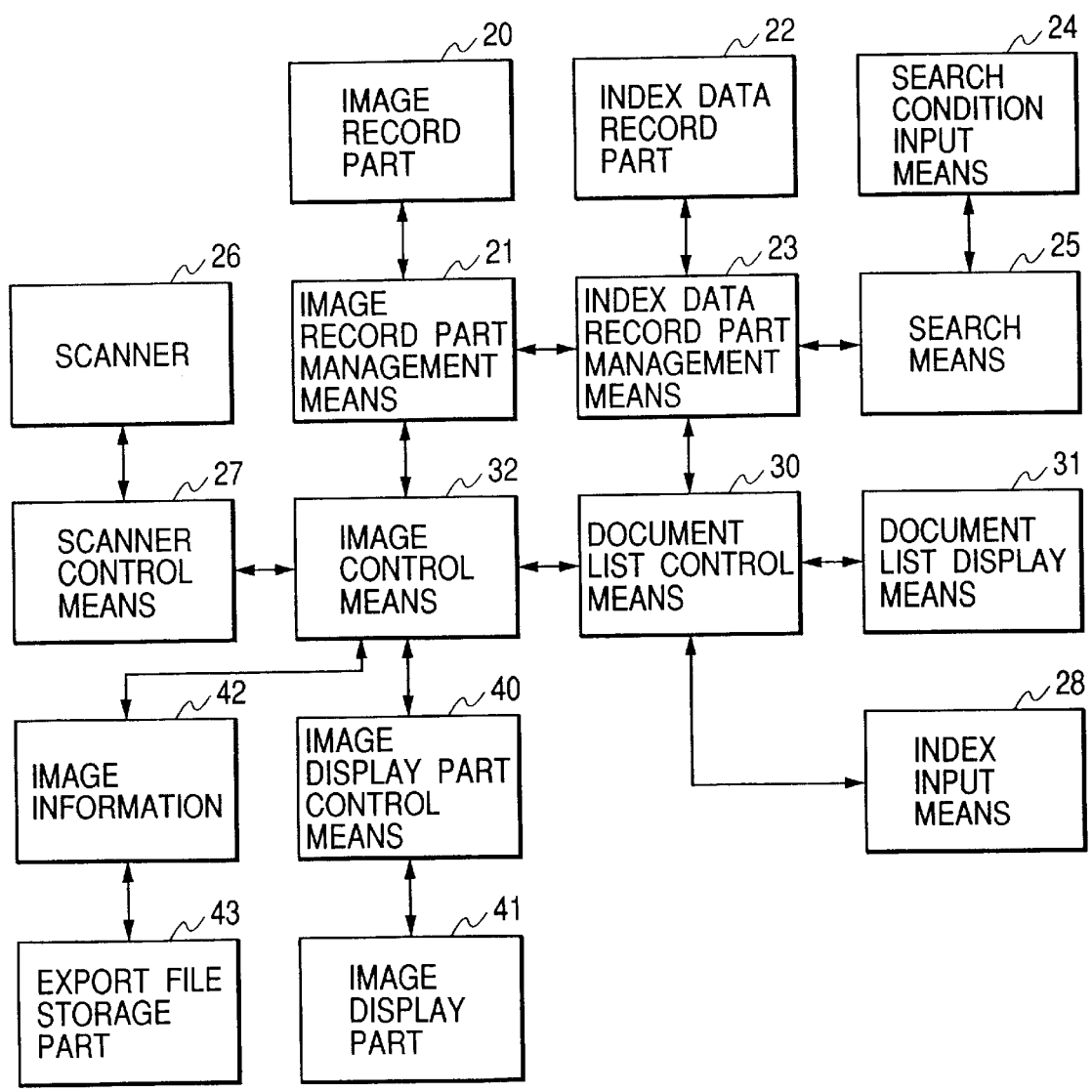
FIG. 29 is a diagram of various functions realized by file management processing in a file management system the hardware constitution.

Referring to FIG. 26, there is shown a flowchart of an operation procedure for scanning each page for an image to be stored in a file tagged with a file tag on the document list W.

Scan processing is started for a file tagged with a file tag in Step S521 and then the first file is selected in the document list W in Step S522, first. It is judged whether or not the selected file is tagged with a file tag 71 in Step S523. If it is tagged with the file tag 71, it is judged whether or not the selected file is an image containing file in Step S524. If it is judged to be an image containing file, the scanned image is added subsequently to the last page in the file in Step S524.

If the selected file is judged not to be an image containing file (NO in S524), it is judged whether or not the selected file is a pre-indexed file in Step S526. If it is judged to be a pre-indexed file, a new scan of an image is executed in Step S527.

If the selected file is judged not to be a pre-indexed file (NO in S526), it is judged whether or not it is a new file in Step S528. If it is a new file, a new scan of an image is executed in Step S527.

In Step S529, it is judged whether or not the selected file is the last file on the document list W. If it is not the last file, the control progresses to processing of the next file in Step S530, and Step S523 to Step S529 are repeated. If it is the last file, a scan operation of tagged files with a file tag is terminated in Step S531.

Although images can be scanned with checking files one by one as a method of scanning and storing images in files in the document list W, it is also possible to take a method of scanning images for recording while automatically feeding files tagged with a file tag in a sequential order such as a method of recording images sequentially while feeding files in unit of a page for a single file as described in this embodiment or a method of feeding files sequentially while recording images of a plurality of predetermined pages.

Although images are stored with scanning in the third embodiment, the same effects are obtained when new images are additionally stored, for example, by using an image copy or import method instead of it.

As described above, when scanning images for the corresponding files tagged with a file tag by using a document list W, the images are scanned continuously while judging file types or attributes included in the document list, and therefore a plurality of files can be efficiently scanned.

In the above embodiment, the post-indexing, printing, and scanning methods have been described for files with a file tag or pages with a page tag for the document list W. These methods, however, apparently show the same effects also in a batch operation of a plurality of arbitrary files or pages in the document list W such as a file deletion, a file copy, a file export, a file integration, pre-indexing, a file movement, a displayed page movement, a displayed file movement, an index modified file movement, or the like.

In addition, the present invention can be applied to a system comprising a plurality of devices or an apparatus comprising a single device.

It is apparent that the present invention is achieved by supplying a storage medium containing software program codes for realizing functions of the above embodiments to a system or an apparatus so that a computer (or CPU or MPU) of the system or the apparatus can read out the program codes stored in the storage medium so as to run the program codes.

In this case, the program codes themselves read out from the storage medium performs the functions of the above embodiments and the storage medium containing the program codes forms the present invention.

As storage mediums for supplying the program codes, there are a floppy disk, a hard disk, an optical disk, an optical magnetic disk, a CD-ROM, a CD-R, a magnetic tape, a nonvolatile memory card, a ROM or the like, for example.

It is apparent that the present invention is not limited to the functions of the above embodiments realized by executing the program codes read out by the computer, but includes functions of the above embodiments realized by actual processing partially or entirely performed by an operating system executing in the computer on the basis of an instruction of the program codes.

Furthermore, it is apparent that the present invention also includes functions of the above embodiments realized by actual processing partially or entirely performed by the CPU in a feature expansion board or a function expansion unit on the basis of instructions of program codes read out from the storage medium after the program codes are written into a memory in the function expansion board inserted in the computer or in the function expansion unit connected to the computer.

As described in details above, according to the present invention, in a single file list respectively collected together in a file unit for listing attribute information of recorded files, file search result information, and index information, identical identification information is added to a plurality of files for which identical processing is required to be performed in the file list. Afterward, in file list, A processing execution for searching for files to which the identification information is added in the list and performing predetermined processing for the files which have been found is performed.

By these processing, operability is improved because operations for newly recording and adding files, or operations for searching and recording can be performed at a time.

In addition, operability is improved because inputting index data and printing files can be continuously performed for a plural files.

Furthermore, operability is improved because a common storing method can be used without distinguishing file attributions even though files having various attributions are mixed, e.g. files having new files, pre-index files and searched files with recorded images.

[Fourth Embodiment]

The fourth embodiment of the present invention is explained here with figures. With respect to common part with the first embodies, common figures are referred in the following description.

(Hardware Constitution)

Referring to FIG. 28, there is shown a block diagram of a constitution of a document management system according to the first embodiment. In this diagram, a central processing unit (CPU) 1 controls the entire document management system and is connected to a bus 18 for transmitting image information or instruction information of various operations.

A CRT display 3, which displays an image of the image information or a document list for a user, is connected to the bus 18 via a display interface circuit 2. A keyboard or a pointing device 5, which is used for a user to give instructions on various operations of the document management system, is connected to the bus 18 via a keyboard interface circuit 4.

A scanner 26, which reads image information from a subject, is connected to the bus 18 via a scanner interface circuit 6. A magnetic disk or an optical magnetic disk (memory for an image data) 9, which is used for storing image information and identification information for managing each image information, is connected to the bus 18 via a memory interface circuit 8.

An index database memory 11, in which is recorded a database for storing various index information which has been inputted by a user with being related to the image identification information, is connected to the bus 18 via a memory interface circuit 10.

A RAM (a memory for a program execution) 13 used for running a program of a filing system is connected to the bus 18 via a memory interface circuit 12. A magnetic disk or an optical magnetic disk (a memory for a program storage) 15, which is used for storing the program of the filing system, is connected to the bus 18 via a memory interface circuit 14.

A disk drive (an external disk drive connection device) 17, which is used for connecting a floppy disk or the like in which the program of the filing system is stored, is connected to the bus 18 via an external disk interface circuit 16. A reference numeral 204 indicates a memory for converting and storing image information document information list in a general image file format, comprising a magnetic disk or an optical magnetic disk. The memory is connected to the bus 18 via memory interface circuit 203.

A program for executing in a file management system is supplied by a floppy disk or the like. The program stored in the floppy disk is read from a disk drive 17 and stored in the magnetic disk 15. Afterward, the program is loaded into the RAM 13 and executed by the CPU 1.

(Software Processing)

Referring to FIG. 2, there is shown constituents of various functions embodied by file management processing in a file management system.

In this diagram, there are shown an image record means 20 for recording an image as document information, an image record management means 21 for managing data in the image record means 20 with keeping consistency, and an index data record means 22 for recording index data for searching for a document.

There are further shown an index data record management means 23 for managing data in the index data record means 22 with keeping consistency, a search condition input means 24 for inputting search conditions for a search for a desired document, and a search part 25 for a search for the desired document from the database. The search condition input part 24 comprises a keyboard and a search condition input screen.

A scanner 26 is used for reading image data from a manuscript such as a drawing, a scanner control means 27 is for controlling the scanner 26, and an index input means 28 is for inputting index data. A document list control means 30 controls a document list display means 31 which displays a document list. An image control means 32 controls a document image and an image display control means 40 controls an image display means 41 to display the document image.

A document list control means 30 controls the document list display means 31 and is connected to the index data record management means 23, the image control means 32, and the index input means 28. The image control means 32 is connected to the image record management means 21, the document list control means 30, the scanner control means 27, and the image display control means 40.

A reference numeral 42 indicates image information conversion means to convert image information sent from image control means 32, said conversion means connecting to export file storage part 43 for storing converted image information and image control means 32. The term "export" represents said operation for converting and storing files in a general image file format in the following description.

Next, searching document, newly recording document and inputting index are explained below.

(Search Operation)

First, a user inputs search conditions for searching for a desired document from the search condition input means 24. As the search conditions, there are key words, for example. The inputted search conditions are transmitted to the search means (generally referred to as a search engine) 25 through index data record management means 23, and the search means 25 finds out a document which satisfies the search conditions from the document database via the index data record management means 23 for managing data of the index data record means 22 and outputs the result to the document list control means 30. The document list control means 30 prepares a document list from the result and displays it to the document management list display means 31 generally comprising a CRT and CRT control circuit.

(New Record)

A user starts the scanner control part 27 to read a new document from the scanner 26. The scanner 26 reads a content of a predetermined number of manuscript sheets and outputs the image data to the image control means 32. The image control means 32 records the image data into the image record means 20 via the image record management means 21 and reports new document creating information to the document list control means 30.

The document list control part 30 creates a new record on the basis of the new document creating information and adds it to the already displayed document list for a display. This record includes updated document attributes, e.g. an entry date and the number of pages, defined at scanning time. The updated document attributes are recorded into the index data record means 22 via index data record management means 23.

(Post-index)

A user designates start for inputting indexes to document list control means 30. Document list control means 30 shifts a mode to receive output from index input means 28 by said designation. Next, the user inputs indexes from index input means 28. In this step, indexes are inputted as corresponding to said newly scanned document. Inputted indexes are displayed at a determined location in a document list with document list control means 30. Inputted index data is sent to index data recording part 22 and recorded through index data record management means 23 automatically, or in accordance with the user's designation through document list control means 30.

(Pre-index)

It is possible to input index information prior to document input. Operation of said pre-index is explained as below.

A user instructs the document list control means 30 to perform an index pre-input operation. By this instruction, the document list control means 30 enables an index input which is currently not related to image data for a new record at the bottom of the document list. Then, the user inputs a new index data from the index input means. This data is displayed in the document list by the document list control part 30 and recorded into the index data record part 22 via the index data record management part 23, if necessary.

(Recording Image for Index Pre-input Record)

A user inputs image data corresponding to the above index pre-input record. First, the user selects an index pre-input record for which the image data is inputted for the document list control means 30. Next, the image data is read from the scanner 26 with the scanner control means 27. The image data is sent to the image display part 41 via the image display control means 40 by the image control means 32 and sent to the image record management means 21 so as to be recorded into the image record part 20. The image record part 20 transmits address information of the recorded image to the document list control means 30 via the image control means 32 or directly.

Read-in information such as the number of document pages is sent from the image control means 32 to the document list control means 30. The document list control means 30 records this read-in information into the index data record part 22 via the index data record management means 23 and changes a status of the corresponding record in the document list from the index pre-input record to an ordinary document. Furthermore, the document list control means 30 updates a display of the document list. It is also possible for the system to have a constitution in which the address information of the recorded image is directly transmitted from the image record management means 21 to the index data record management means 23.

(Display and Export of Image Information)

A user can select an arbitrary files from a document list and designate to display and print their image information.

The user chooses an arbitrary file in a document list and designates displayed images with keyboard 5 or the like. By the designation, document list control means 30 obtains search information of images in chosen file from index data control part 22 via index data record part management means 23. Next, document list control means 30 sends search information and display designation for images to display control means 32. Image control means 32 obtains image information from image record part 20 via image record part management means 21 based on the search information for received images and sends the image information to image display part control means 40. Image information part control means 40 designates image display part 41 to display the received image information.

In the same manner, for exporting image information, document list control means 30 receiving image information chosen by a user sends search information and print designation of images to display control means 32. Image control means 32 obtains image information from image record part 20 via image record part management means 21 based on the search information for received images, sends the image information to image information change means 42 and converts the image information in a general image file format. Converted image information is stored in export file storage part 43.

Next, the above description about said operations is explained in detail with examples of document lists.

(Constitution of Document List)

Referring to FIG. 4, there is shown a diagram of a display screen of the document list W. The document list W is created by the document list control part 30 and displayed on display 3. In this document list W, files as a search result and new files inputted from scanner 26 are displayed. A property column 51 indicates a file status, a file number column 52 indicates a number in the list, and columns 53, 54 and 56 indicate document index items. A column 55 indicates the number of pages of each file and a column 57 indicates an entry date when an image of a subject is recorded by scanner 26.

A user can freely design the index items according to a type of the document by using a database structure setting means which is not shown. In the example shown in FIG. 4, a Title item 53 for indicating a document title, a Chapter item 54 for indicating each end of chapters in a document, and a Rank item 56 for indicating an evaluation of a document are added as the index information for a document management. The order of these columns can be arbitrarily changed.

The document list W in FIG. 4 shows image recorded files and pre-index files each having only previously inputted index on the same screen in a manner in which a user can clearly distinguish between them. Icons 58 and 59 indicated in properties column 51 indicate states of respective files; icon 58 indicates that image information is already recorded in a file, icon 59 indicates that image information has not been recorded yet in a file and it is an pre-index file. Therefore, in the document list W in FIG. 4, it is easily understood that the files having file numbers 1 to 10 indicated by ranges 60 and 61 are image recorded files and that the files having file numbers 11 to 15 indicated by range 62 are pre-index files.

The files in the range 60 are existing files in which image information and index information are recorded, the files in the range 61 are new files in which image information is stored while index information is not inputted, and the files in the range 62 are pre-index files in which only index information is recorded.

(Search Operation)

Referring to FIGS. 5A and 5B, there is shown a diagram of a display screen for executing a search operation in the document list W. The document list W in FIG. 5A is an example of an initial status before performing search operation, including information for all stored document. If a user inputs "A" in the Rank column as a search condition in the search condition input means 24 at this point, the search means 25 finds out a record (file) satisfying the search condition from the index data record part 22 via the index data record management means 23 on the basis of the search condition and outputs the result to the document list control means 30. The document list control means 30 creates a document list based on the result and displays it in the document list display means 31. FIG. 5B shows a display screen of a document list W which has been created with this search operation and displayed.

(New Record)

Referring to FIGS. 6A and 6B, there is shown a document list W for executing a new record operation. A document list prior to a new record operation is shown in FIG. 6A. Now, a new document is read using scanner 26 and new document creating information is reported to the document list control means 30.

The document list control means 30 creates a new record on the basis of the new document creating information and adds it to the already displayed document list for a display. Created and updated document attributes are recorded into the index data record part 22 via the index data record management means 23. FIG. 6B shows a display screen of a document list W which is displayed after this recording operation of the new document. Records (files) having file numbers 4, 5, and 6 shown in FIG. 6B have been created and there are displayed the number of pages corresponding to the image information scan, entry dates, and icons in the properties column for indicating file attributes.

(Post-index)

Referring to FIGS. 7A and 7B, there is shown a diagram of a display screen for executing an index information post-input operation in the document list W. A user instructs the document list control means 30 to start an index input. This instruction causes the document list control means 30 to enter a mode for receiving an output from the index input means 28 as shown in FIG. 7A.

A user inputs a predetermined index from the index input means 28. The input index is displayed at a predetermined place in the list by the document list control means 30 and is recorded into the index data record part 22 via the index data record management means 23 automatically or by a user's instruction to the document list control means 30.

After a completion of an input operation of a single index item, it is possible to start an input operation of the next index item (in the next column on the right side, for example). In the same manner, after a completion of an index input operation into a single record (file), it is possible to start an index input operation into the next record (file) (in the next row of the list, for example). For example, an index input is started from the Title column of the file number 4 as shown in FIG. 7A and the index input operation is continuously performed up to the Rank column of the file number 6 as shown in FIG. 7B.

Furthermore, it is also possible to limit a specification of input columns to Chapter and Rank for a continuous input.
(Pre-index)

Referring to FIGS. 8A and 8B, there is shown a diagram of a display screen for executing an index information pre-input operation in the document list W. A user instructs the document list control means 30 to start an pre-index. This instruction causes the document list control means 30 to enable an index input currently not related to image data for the lowest new record in the document list as shown in FIG. 8A.

A user inputs new index data from the index input means 28. This data is displayed in the document list by the document list control means 30 and is recorded into the index data record part 22 via the index data record management means 23, if necessary.

After a completion of an input operation of a single index item, it is possible to start an input operation of the next index item. In the same manner, after a completion of an index input operation into a single record (file), it is possible to start an index input operation for the next record (file), and at this point a file not related to the image data is created as an index pre-input file. For example, an index input is started from the Title column of the new file as shown in FIG. 8A and the index input operation is continuously performed up to the Chapter column of the file number 9 as shown in FIG. 8B. The index pre-input files having the file numbers 7, 8, and 9 are created in this manner.
(Recording Image into Index Pre-input Record)

Referring to FIGS. 9A and 9B, there is shown a document list W for recording an image into a pre-input file of the index information. A user selects an pre-index record in which image data is to be inputted as shown in FIG. 9A for the document list control means 30, first.

The image data is read from the scanner 26 by the scanner control means 27. The image data is sent to the image display means 41 via the image display control means 40 by the image control means 32 and sent to the image record management means 21 so as to be recorded into the image record part 20. The image record part 20 transmits address information of the recorded image to the document list control part 30 via the image control means 32 or directly.

Read-in information such as the number of document pages is sent from the image control means 32 to the document list control means 30. The document list control means 30 records this read-in information into the index data record part 22 via the index data record management means 23 and changes a status of the corresponding record in the document list from the index pre-input record to an ordinary document.

Furthermore, the document list control means 30 updates a display of the document list. FIG. 9B shows a display screen of the document list W which has been created by this recording operation of the new document and displayed. Image information is inputted into the files having file numbers 7, 8, and 9 and the number of pages, the entry dates, and the icons of the Properties column for indicating file attributes are updated from icon 59 to icon 58 in the list.
(Export Operation)

There may be files containing a plurality of documents on the document list. Images of these documents are generally stored in units of a page. Although a single image is generally stored on a single page, in some cases a single page is composed of a plurality of images such as a double sided image stored as a single page or images of old versions stored since the image can be revised in units of a page.

In general there are two types of file storage formats for recording image information; a file storage format for storing a single image and a file storage format for storing a plurality of images. In this embodiment, the file storage format for storing a plurality of images is used for the description. An export operation will be described below by referring to FIGS. 30 to 34.

Figure 30:
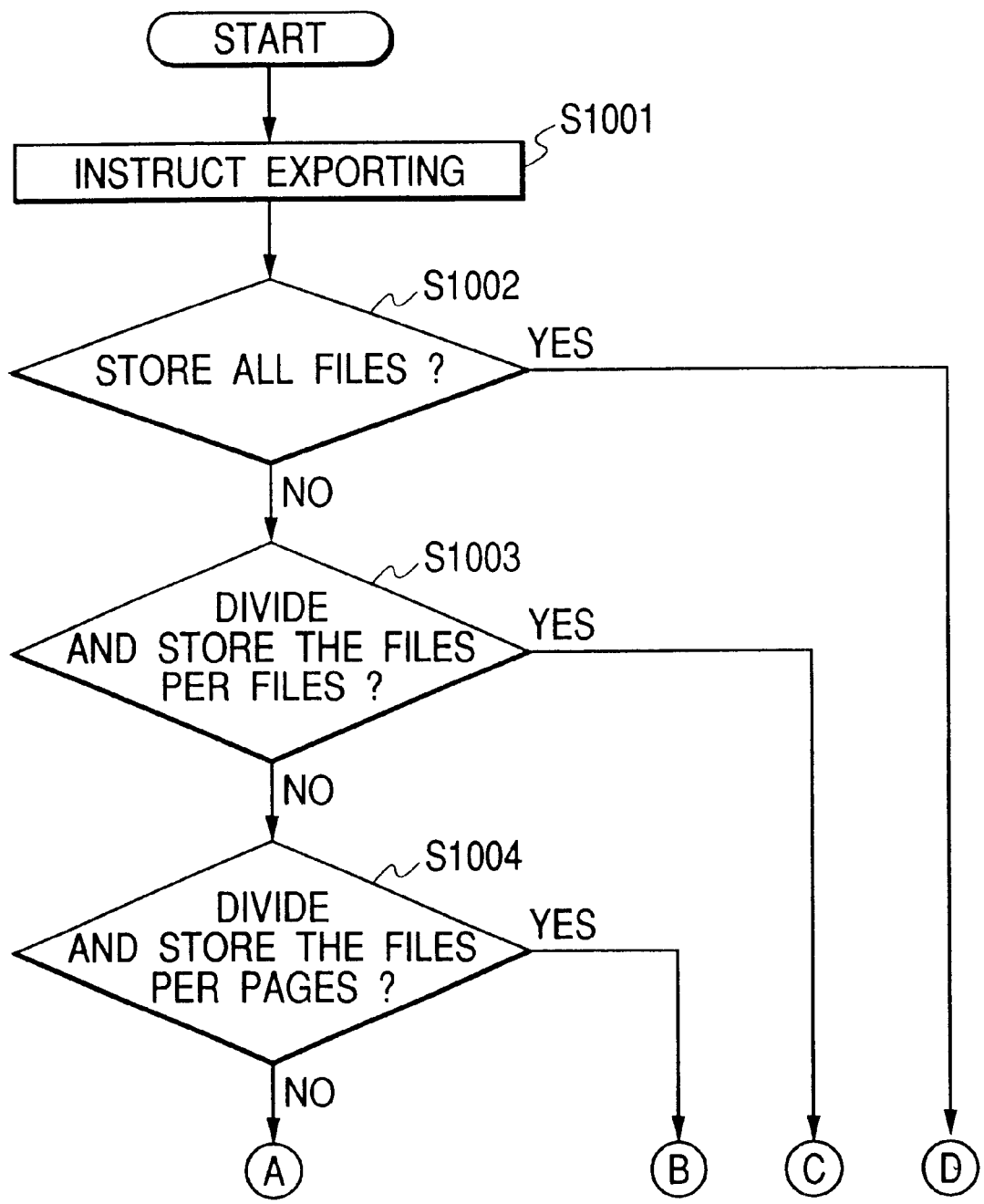
FIG. 30 is a flowchart diagram showing a processing part for selecting an export file storage unit.
Figure 31:
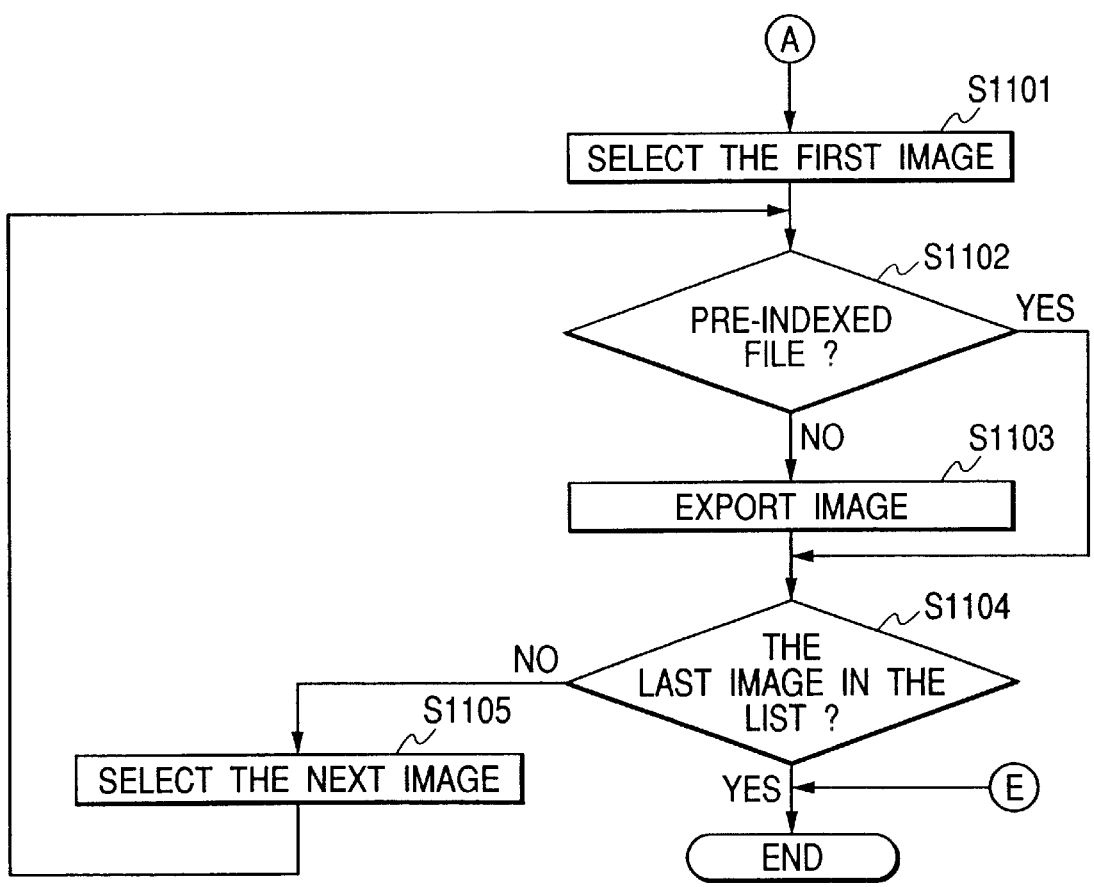
FIG. 31 is a flowchart diagram showing a processing part for dividing export files per a image.
Figure 32:
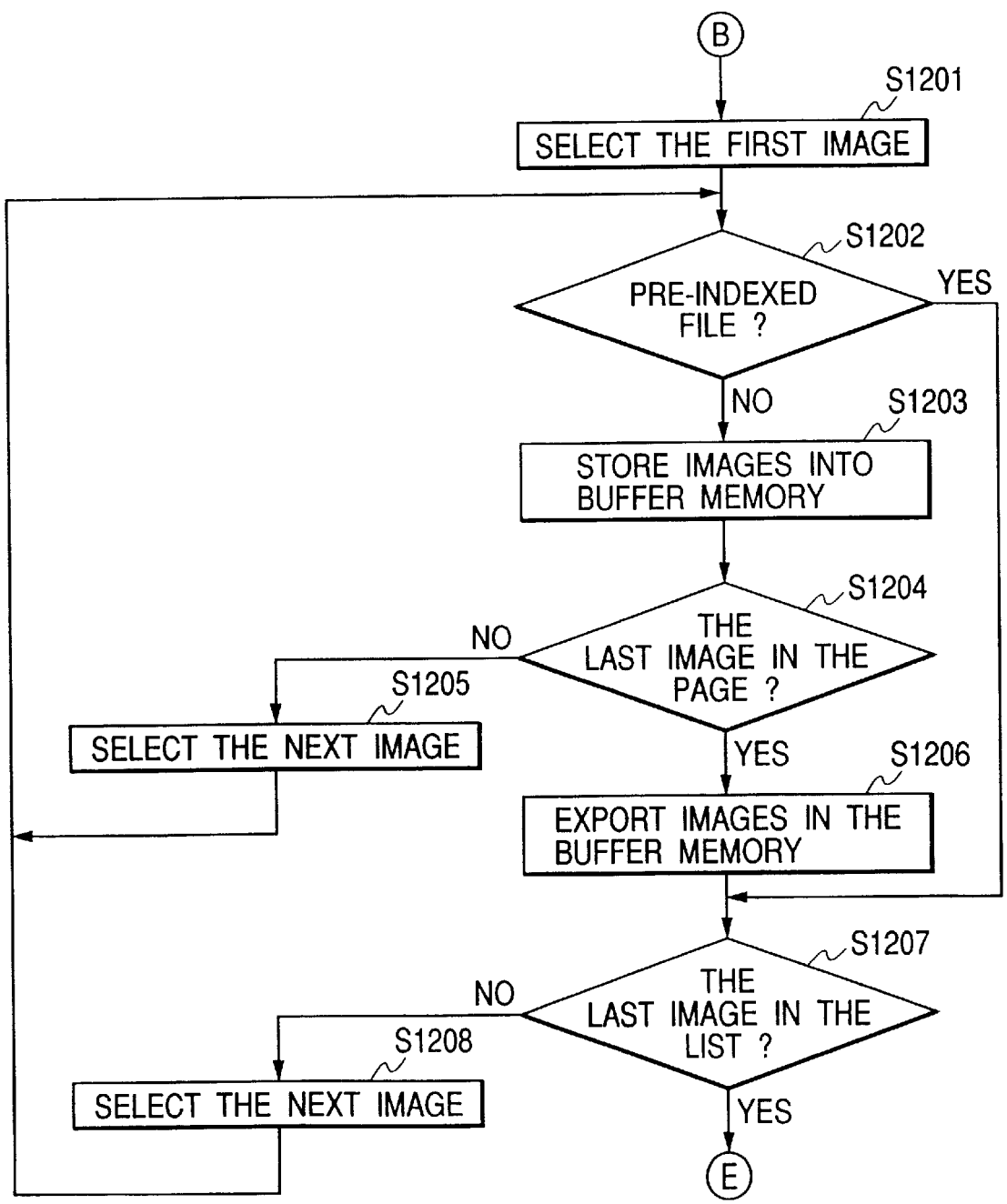
FIG. 32 is a flowchart diagram showing a processing part for dividing export files per a page.
Figure 33:
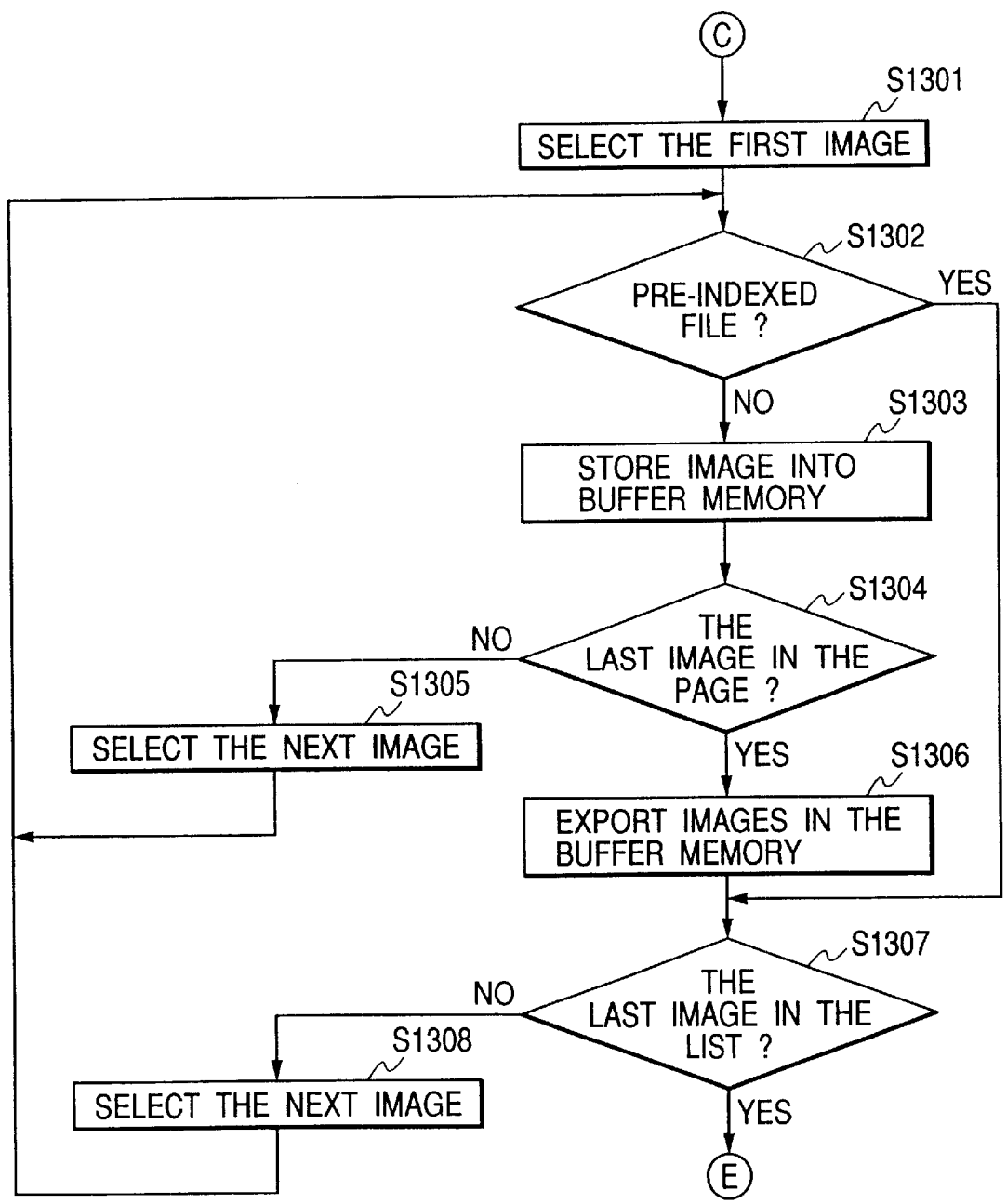
FIG. 33 is a flowchart diagram showing a processing part for dividing export files per a file.

Referring to FIG. 30, there is shown a flowchart of a processing procedure for selecting a storage unit of export files. Referring to FIG. 31, there is shown a flowchart of a processing procedure for dividing the export files in units of an image. Referring to FIG. 32, there is shown a flowchart of a processing procedure for dividing the export files in units of a page. Referring to FIG. 33, there is shown a flowchart of a processing procedure for dividing the export files in units of a file. Referring to FIG. 34, there is shown a flowchart of a processing procedure for storing the export files into a single export file.
(Selecting Export File Storage Unit)

In FIG. 30, a user gives an instruction on exporting all files on the document list W (S1001), first. At this time, the user selects a unit for storing files on the document list W into export files to be created. In other words, if all files are stored into a single export file (YES in S1002), the control progresses to processing in FIG. 34. If the files are divided in units of a file to be stored into respective export files (YES in S1003), the control progresses to processing in FIG. 33. If they are divided in units of a page to be stored into respective export files (YES in S1004), the control progresses to processing in FIG. 32. If they are divided in units of an image to be stored into respective export files as other processing (NO in S1004), the control progresses to FIG. 31. (Dividing processing in units of image: Processing in FIG. 31)

First, the document list control means 30 selects the first file on the document list W and selects the first image information (image) in the file. Then, identification information of the selected image is obtained from the index data record part 22 via the index data record part management means 23. The obtained identification information and an image display request are transmitted to the image control means 32. The image control means 32 obtains required image information from the image record part 20 via the image record part management means 21 on the basis of the identification information received from the document list control means 30 (S1101). It is judged whether or not the selected file is a file not having image information such as a pre-indexed file (S1102). If the file has image information, the image information is transmitted to the image information change means 42. The image information change means 42 converts the image information received from the image control means 32 to information in a general image file format and stores it into the export file storage part 43 (S1103). If the file does not have image information (YES in S1102), an export operation is not performed and the control progresses to Step S1104.

It is judged whether or not the selected image is the last image of the last file on the document list (S1104). If the currently processed image is not the last image, the document list control means 30 obtains identification information of the next image information (image) on the document list W from the index data record part 22 via the index data record part management means 23. The obtained identification information and the image display request are transmitted to the image control means 32. The image control means 32 obtains required image information from the image record part 20 via the image record part management means 21 on the basis of the identification information received from the document list control means 30 (S1105) and continues the export operation. If the currently processed image is the last image (YES in S1104), the processing is terminated. (Dividing processing in units of page: Processing in FIG. 32)

First, the document list control means 30 selects the first file on the document list W, selects the first page in the file, and selects the first image information (image) on the page. Then, identification information of the selected image is obtained from the index data record part 22 via the index data record part management means 23. The obtained identification information and an image display request are transmitted to the image control means 32. The image control means 32 obtains required image information from the image record part 20 via the image record part management means 21 on the basis of the identification information received from the document list control means 30 (S1201). It is judged whether or not the selected file is a file not having image information such as a pre-indexed file (S1202). If the file has image information, the image information is temporarily stored in the memory 13 or the like for a program execution (S1203). Furthermore, it is judged whether or not the currently processed image is the last image of the page (S1204). If it is not the last image of the page, the document list control means 30 obtains identification information of the next image information in the same page on the document list W from the index data record part 22 via the index data record part management means 23. The obtained identification information and the image display request are transmitted to the image control means 32. The image control means 32 obtains required image information from the image record part 20 via the image record part management means 21 on the basis of the identification information received from the document list control means 30 (S1205) and continues the export operation.

If it is the last image of the page (YES in S1204), the document list control means 30 transmits a plurality of image information of a single page stored in the memory 13 for a program execution together to the image information change means 42. The image information change means 42 converts the image information received from the image control means 32 to information in a general image file format and stores it into the export file storage part 43 (S1206).

If the file does not have image information (YES in S1202), an export operation is not performed and the control progresses to Step S1207.

It is judged whether or not the currently processed image is the last image of the last page of the last file on the document list W (S1207). If it is not the last image, the document list control means 30 obtains identification information of the first image information on the next page of the same file on the document list W from the index data record part 22 via the index data record part management means 23. The obtained identification information and the image display request are transmitted to the image control means 32. The image control means 32 obtains required image information from the image record part 20 via the image record part management means 21 on the basis of the identification information received from the document list control means 30 (S1208) and continues the export operation. If the currently processed image is the last image (YES in S1207), the processing is terminated.

(Dividing Processing in Units of File: Processing in FIG. 33)

First, the document list control means 30 selects the first file on the document list W and selects the first image information (image) of the file. Then, identification information of the selected image is obtained from the index data record part 22 via the index data record part management means 23. The obtained identification information and an image display request are transmitted to the image control means 32. The image control means 32 obtains required image information from the image record part 20 via the image record part management means 21 on the basis of the identification information received from the document list control means 30 (S1301). It is judged whether or not the selected file is a file not having image information such as a pre-indexed file (S1302). If the file has image information, the image information is temporarily stored in the memory 13 or the like for a program execution (S1303). Furthermore, it is judged whether or not the currently processed image (image information) is the last image of the file (S1304). If it is not the last image of the file, the document list control means 30 obtains identification information of the next image information in the same file on the document list W from the index data record part 22 via the index data record part management means 23. The obtained identification information and the image display request are transmitted to the image control means 32. The image control means 32 obtains required image information from the image record part 20 via the image record part management means 21 on the basis of the identification information received from the document list control means 30 (S1305) and continues the export operation.

If it is the last image of the file (YES in S1304), the document list control means 30 transmits a plurality of image information of a single file stored in the memory 13 for a program execution together to the image information change means 42. The image information change means 42 converts the image information received from the image control means 32 to information in a general image file format and stores it into the export file storage part 43 (S1306).

If the file does not have image information (YES in S1302), an export operation is not performed and the control progresses to Step S1307.

It is judged whether or not the currently processed image is the last image of the last file of the last file on the document list W (S1307). If it is not the last image, the document list control means 30 obtains identification information of the first image information on the next file on the document list W from the index data record part 22 via the index data record part management means 23. The obtained identification information and the image display request are transmitted to the image control means 32. The image control means 32 obtains required image information from the image record part 20 via the image record part management means 21 on the basis of the identification information received from the document list control means 30 (S1308) and continues the export operation. If the currently processed image is the last image (YES in S1307), the processing is terminated.

(All File Storing Processing: Processing in FIG. 34)

First, the document list control means 30 selects the first file on the document list W and selects the first image information (image) of the file. Then, identification information of the selected image is obtained from the index data record part 22 via the index data record part management means 23. The obtained identification information and an image display request are transmitted to the image control means 32. The image control means 32 obtains required image information from the image record part 20 via the image record part management means 21 on the basis of the identification information received from the document list control means 30 (S1401). It is judged whether or not the selected file is a file not having image information such as a pre-indexed file (S1402). If the file has image information, the image information is temporarily stored in the memory 13 or the like for a program execution (S1403). If it does not have image information, the image information storing operation is not performed and the control progresses to Step S1404. Furthermore, it is judged whether or not the currently processed image is the last image of the last file on the document list (S1404). If it is not the last image of the file, the document list control means 30 obtains identification information of the next image information in the same file on the document list W from the index data record part 22 via the index data record part management means 23, or it obtains the identification information of the first image information of the next file on the document list W. The obtained identification information and the image display request are transmitted to the image control means 32. The image control means 32 obtains required image information from the image record part 20 via the image record part management means 21 on the basis of the identification information received from the document list control means 30 (S1405) and continues the export operation. If the currently processed image is the last image of the file, the document list control means 30 transmits a plurality of image information stored in the memory 13 for a program execution together to the image information change means 42. The image information change means 42 converts the image information received from the image control means 32 to information in a general image file format and stores it into the export file storage part 43 (S1406) and the processing is terminated.

Although there has been shown an example of a file format in which a plurality of image information can be stored in a single export file in the embodiment set forth in the above, the present invention can be applied to a file format in which only a single image information is stored in a single export file besides it. In this case, the image information is divided in units of an image to be stored into export files only.

In addition, although the export operation of the image information has been described in this embodiment, the same processing can be performed also in an output operation of the image information with an image information output means such as, for example, a printing operation with a printer which is not shown.

Furthermore, although all files on the document list are exported in this embodiment, it is also possible to perform the same export processing for a single file selected by a user or a plurality of arbitrary files selected with an identification mark or the like which can be arbitrarily set by the user on the document list.

Although the export operation is continued even if a pre-indexed file is selected in this embodiment, instead, if a pre-indexed file is selected for export processing, it is possible to display a warning for a user by using a display unit, for example, and further to provide a function by which a user can select a continuation or a stop of the export processing when watching the warning display.

In addition, the present invention can be applied to a system comprising a plurality of devices or an apparatus comprising a single device.

It is apparent that the present invention is achieved by supplying a storage medium containing software program codes for realizing functions of the above embodiments to a system or an apparatus so that a computer (or CPU or MPU) of the system or the apparatus can read out the program codes stored in the storage medium so as to run the program codes.

In this case, the program codes themselves read out from the storage medium performs the functions of the above embodiments and the storage medium containing the program codes forms the present invention.

As storage mediums for supplying the program codes, there are a floppy disk, a hard disk, an optical disk, an optical magnetic disk, a CD-ROM, a CD-R, a magnetic tape, a nonvolatile memory card, a ROM or the like, for example.

It is apparent that the present invention is not limited to the functions of the above embodiments realized by executing the program codes read out by the computer, but includes functions of the above embodiments realized by actual processing partially or entirely performed by an operating system executing in the computer on the basis of an instruction of the program codes.

Furthermore, it is apparent that the present invention also includes functions of the above embodiments realized by actual processing partially or entirely performed by the CPU in a feature expansion board or a function expansion unit on the basis of instructions of program codes read out from the storage medium after the program codes are written into a memory in the function expansion board inserted in the computer or in the function expansion unit connected to the computer.

As described in details above, according to the present invention, at least one file is specified in accordance with designation from an external device and one of a plurality of storage methods for storing image information constituting said specified files is selected in accordance with designation from an external device. Then, image information constituting the specified files is stored in said selected storage method.

By the system, operability is improved, converting a file type of image information in files to a general image file type.

What is claimed is:

1. A file management system which stores a plurality of files respectively including a plurality of image information, comprising:
    specification means for specifying for each of a plurality of files in a list whether the file has both image information and index information recorded, has only image information recorded, or has only index information recorded;
    selection means for selecting one of a plurality of storage methods for storing image information corresponding to any files in the list specified as having image information by said specification means; and
    storage means for storing image information specified by said specification means in the storage method selected by said selection means,
    wherein said storage means skips any file in the list which has only index information recorded and processes the remaining files in the list.

2. A file management system according to claim 1, wherein said one of the plurality of storage methods is a method of storing image information into an export file for each image information.

3. A file management system according to claim 1, wherein said one of the plurality of storage methods is a method of dividing the image information per a page constituting a file and storing said divided information into an export file.

4. A file management system according to claim 1, wherein said one of the plurality of storage methods is a method of dividing the image information per a file and storing said divided information into an export file.

5. A file management system according to claim 1, wherein said one of the plurality of storage methods is a method of storing the image information of all files together into a single export file.

6. A file management system according to claim 1, wherein, if the plurality of files specified by said specification means contain files in which image information is not recorded, a warning is displayed.

7. A file management system according to clam 1, wherein the storage methods comprise a method of storing image information for all files processed by said storage means in a single file, a method of storing image information for each file processed by said storage means in a separate file, and a method of storing each page of image information for each file processed by said storage means in a separate file.

8. A file management method for a file management system which stores a plurality of files each formed by a plurality of image information, comprising:
    specification process for specifying for each of a plurality of files in a list whether the file has both image information and index information recorded, has only image information recorded, or has only index information recorded;
    selection process for selecting one of a plurality of storage methods for storing image information corresponding to any files in the list specified as having image information in said specification process; and
    storage process for storing image information specified in said specification process in the storage method selected in said selection process,
    wherein said storage process skips any file in the list which has only index information recorded and processes the remaining files in the list.

9. A file management method according to claim 8, wherein said one of the plurality of storage methods is a method of storing image information into an export file for each image information.

10. A file management method according to claim 8, wherein said one of the plurality of storage methods is a method of dividing the image information in units of a page constituting a file and storing it into an export file.

11. A file management method according to claim 8, wherein said one of the plurality of storage methods is a method of dividing the image information in units of a file and storing it into an export file.

12. A file management method according to claim 8, wherein said one of the plurality of storage methods is a method of storing the image information of all files together into a single export file.

13. A file management method according to claim 8, wherein, if the plurality of files specified in said specification process contain files in which image information is not recorded, a warning is displayed in said storage process.

14. A file management method according to claim 8, wherein the storage methods comprise a method of storing image information for all files processed by said storage process in a single file, a method of storing image information for each file processed by said storage process in a separate file, and a method of storing each page of image information for each file processed by said storage process in a separate file.

15. A storage medium for storing a file management method for a file management system which stores a plurality of files each formed by a plurality of image information, comprising:
    specification process program code for specifying for each of a plurality of files in a list whether the file has, both image information and index information recorded, has only image information recorded, or has only index information recorded;
    selection process program code for selecting one of a plurality of storage methods for storing image information corresponding to any files in the list specified as having image information in said specification process program code; and
    storage process program code for storing image information specified in said specification process program code in the storage method selected in said selection process program code,
    wherein said storage process program code skips any file in the list which has only index information recorded and processes the remaining files in the list.

16. A storage medium according to claim 15, wherein said one of the plurality of storage methods is a method of storing image information into an export file for each image information.

17. A storage medium according to claim 15, wherein said one of the plurality of storage methods is a method of dividing the image information per a page constituting a file and storing it into an export file.

18. A storage medium according to claim 15, wherein said one of the plurality of storage methods is a method of dividing the image information per a file and storing it into an export file.

19. A storage medium according to claim 15, wherein said one of the plurality of storage methods is a method of storing the image information of all files together into a single export file.

20. A storage medium according to claim 15, wherein, if the plurality of files specified in said specification process program code contain files in which image information is not recorded, a warning is displayed by said storage process program code.

21. A storage medium according to claim 15, wherein the storage methods comprise a method of storing image information for all files processed by said storage process program code in a single file, a method of storing image information for each file processed by said storage process program code in a separate file, and a method of storing each page of image information for each file processed by said storage process program code in a separate file.

22. A file management system in which a plurality of files can be stored, comprising:
    list management means for managing a single file list allowing pre-index or post-index of files;
    checking means for checking whether a file in the list is pre-index in which index information is recorded before image information or is post-index in which image information is recorded before index information; and
    adding means, if said checked file is not checked as pre-index file, for adding identification information to the checked file.

23. A file management system according to claim 22, wherein said checking comprising further checking whether said checking is executed for all files in the single file list and repeating said checking until all files are checked.

24. A file management system according to claim 22, further comprising:

selecting means for selecting a file in which the identification information is added in the single file list;

display means for displaying file image selected by the selecting means.

25. A file management system according to claim 24, further comprising control setting means for setting data input by a user with reference to the displayed image.

26. A file management method for storing a plurality of files, comprising:

a list management step of managing a single file list allowing pre-index or post-index of files;

a checking step of checking whether a file in the list is pre-index in which index information is recorded before image information or is post-index in which image information is recorded before index information; and an adding step, if said checked file is not checked as pre-index file, of adding identification information to the checked file.

27. A file management method according to claim 26, wherein said checking comprising further checking whether said checking is executed for all files in the single file list and repeating said checking until all files are checked.

28. A file management method according to claim 26, further comprising:

a selecting step of selecting a file in which the identification information is added in the single file list;

a display step of displaying file image selected by the selecting means.

29. A file management method according to claim 28, further comprising control setting step of setting data input by a user with reference to the displayed image.

30. A storage medium storing computer readable program for executing file management method for storing a plurality of files, the computer readable code comprising:

a list management step of managing a single file list allowing pre-index or post-index of files;

a checking step of checking whether each file in the single file list is selected as the pre-index or the post-index; and an adding step, if said checked file is not checked as pre-index file, of adding identification information to the checked file.

31. A storage medium according to claim 30, wherein said checking comprising further checking whether said checking is executed for all files in the single file list and repeating said checking until all files are checked.

32. A storage medium according to claim 30, further comprising:

a selecting step of selecting a file in which the identification information is added in the single file list;

a display step of displaying file image selected by the selecting means.

33. A storage medium according to claim 32, further comprising control setting step of setting data input by a user with reference to the displayed image.

* * * * *

UNITED STATES PATENT AND TRADEMARK OFFICE
CERTIFICATE OF CORRECTION

PATENT NO.    : 6,633,893 B2
DATED         : October 14, 2003
INVENTOR(S)   : Masashi Yahara et al.

It is certified that error appears in the above-identified patent and that said Letters Patent is hereby corrected as shown below:

Column 2,
Line 48, "is" should read -- is a --.

Column 3,
Line 13, "system the" should read -- system; --.
Line 14, "hardware constitution;" should be deleted.
Line 42, "files" should read -- files; --.
Line 44, "attached" should read -- with --.

Column 4,
Line 27, "system the" should read -- system; --.
Line 28, "hardware constitution;" should be deleted.
Line 44, "referring" should read -- reference --.

Column 5,
Line 61, "referring" should read -- reference --.

Column 12,
Line 43, "not" should read -- no --.

Column 16,
Line 31, "a" should be deleted.

Column 30,
Line 10, "whether each file in the single" should read -- whether a file in the list is pre-index in which index information is recorded before image information or is post-index in which image information is recorded before index information; --.

UNITED STATES PATENT AND TRADEMARK OFFICE
CERTIFICATE OF CORRECTION

PATENT NO. : 6,633,893 B2
DATED : October 14, 2003
INVENTOR(S) : Masashi Yahara et al.

It is certified that error appears in the above-identified patent and that said Letters Patent is hereby corrected as shown below:

Column 30 cont.,
Line 11, "file list is selected as the pre-index or the post-index;" should be deleted.

Signed and Sealed this

Twelfth Day of October, 2004

JON W. DUDAS
*Director of the United States Patent and Trademark Office*